United States Patent
Shepard et al.

(10) Patent No.: US 10,455,608 B2
(45) Date of Patent: Oct. 22, 2019

(54) CONTROL CHANNEL DESIGN FOR MANY-ANTENNA MU-MIMO SYSTEMS

(71) Applicant: Skylark Wireless, LLC, Houston, TX (US)

(72) Inventors: Clayton Wells Shepard, Houston, TX (US); Lin Zhong, Houston, TX (US); Abeer Javed, Houston, TX (US); Hang Yu, Houston, TX (US)

( * ) Notice: Subject to any disclaimer, the term of this patent is extended or adjusted under 35 U.S.C. 154(b) by 0 days.

(21) Appl. No.: 15/539,997

(22) PCT Filed: Apr. 23, 2016

(86) PCT No.: PCT/US2016/029077
§ 371 (c)(1),
(2) Date: Jun. 26, 2017

(87) PCT Pub. No.: WO2016/172652
PCT Pub. Date: Oct. 27, 2016

(65) Prior Publication Data
US 2018/0338321 A1    Nov. 22, 2018

Related U.S. Application Data

(60) Provisional application No. 62/152,675, filed on Apr. 24, 2015.

(51) Int. Cl.
*H04W 72/14* (2009.01)
*H04B 7/0452* (2017.01)
(Continued)

(52) U.S. Cl.
CPC ......... *H04W 72/14* (2013.01); *H04B 7/0417* (2013.01); *H04B 7/0452* (2013.01); *H04B 7/0456* (2013.01); *H04B 7/0617* (2013.01); *H04B 7/0695* (2013.01); *H04L 5/0053* (2013.01); *H04L 27/2613* (2013.01);
(Continued)

(58) Field of Classification Search
CPC ... H04W 72/14; H04W 56/001; H04W 68/02; H04W 72/0446; H04B 7/0417; H04B 7/0452; H04B 7/046
See application file for complete search history.

(56) References Cited

U.S. PATENT DOCUMENTS

| | | | |
|---|---|---|---|
| 2009/0176516 A1* | 7/2009 | Trott | H04W 16/10 455/458 |
| 2011/0007704 A1* | 1/2011 | Swarts | H04J 11/0073 370/330 |

(Continued)

*Primary Examiner* — Eric Myers
(74) *Attorney, Agent, or Firm* — Kearney, McWilliams & Davis, PLLC; William C. Yarbrough

(57) ABSTRACT

Disclosed embodiments include methods for control channel design in many-antenna multi-user (MU) multiple-input multiple-output (MIMO) wireless systems. A beacon comprising an identifier of a many-antenna base station is encoded into a base sequence. A plurality of synchronization sequences is generated based on the encoded base sequence and a set of orthogonal beam sequences. The many-antenna base-station transmits, using a plurality of antennas, the plurality of synchronization sequences in a plurality of beam directions associated with the set of orthogonal beam sequences for synchronization and associated with users without knowledge of channel state information (CSI).

23 Claims, 17 Drawing Sheets

(51) Int. Cl.
*H04B 7/0456* (2017.01)
*H04B 7/06* (2006.01)
*H04B 7/0417* (2017.01)
*H04W 56/00* (2009.01)
*H04W 68/02* (2009.01)
*H04W 72/04* (2009.01)
*H04L 5/00* (2006.01)
*H04L 27/26* (2006.01)
*H04W 48/00* (2009.01)

(52) U.S. Cl.
CPC ......... *H04L 27/2692* (2013.01); *H04W 48/00* (2013.01); *H04W 56/001* (2013.01); *H04W 68/02* (2013.01); *H04W 72/0446* (2013.01); *H04B 7/046* (2013.01)

(56) References Cited

U.S. PATENT DOCUMENTS

| | | | | |
|---|---|---|---|---|
| 2013/0064239 A1* | 3/2013 | Yu | ........................ | H04W 72/046 370/350 |
| 2013/0163544 A1* | 6/2013 | Lee | ........................ | H04W 72/04 370/329 |

\* cited by examiner

| Var | Description | Overhead | Description |
|---|---|---|---|
| $L$ | Sequence Length | $C$ | Channel Utilization |
| $B$ | Bandwidth | $D_A$ | Association Delay |
| $F$ | Frame Duration | $D_R$ | Random Access Delay |
| $N$ | # of beams | | |

$$900 \longrightarrow C = \frac{L/B}{F} \quad D_A = \frac{N \cdot F}{2} \quad D_R = \frac{F}{2} \longleftarrow 910$$

| $L$ | $B$ | $F$ | $N$ | $C$ | $D_A$ | $D_R$ |
|---|---|---|---|---|---|---|
| 128 | $20 MHz$ | $15 ms$ | 100 | 0.043% | $750 ms$ | $7.5 ms$ |
| 128 | $40 MHz$ | $1 ms$ | 100 | 0.32% | $50 ms$ | $0.5 ms$ |
| 256 | $20 MHz$ | $10 ms$ | 100 | 0.128% | $500 ms$ | $5 ms$ |
| 256 | $20 MHz$ | $5 ms$ | 500 | 0.256% | $1250 ms$ | $2.5 ms$ |
| 512 | $40 MHz$ | $2 ms$ | 1000 | 0.64% | $1000 ms$ | $1 ms$ |
| 1024 | $80 MHz$ | $1 ms$ | 4000 | 1.28% | $2000 ms$ | $0.5 ms$ |

Encode a beacon into a base synchronization sequence, the beacon comprising an identifier (ID) of a base station
1502

Generate a plurality of synchronization sequences based on the encoded base synchronization sequence and a set of beamforming weights
1504

Transmit, using a plurality of antennas, the plurality of synchronization sequences in a plurality of beam directions associated with the set of beamforming weights
1506

FIG. 15

CONTROL CHANNEL DESIGN FOR MANY-ANTENNA MU-MIMO SYSTEMS

CROSS-REFERENCE TO RELATED APPLICATIONS

This application claims benefit of U.S. Provisional Patent Application Ser. No. 62/152,675, filed Apr. 24, 2015, which is hereby incorporated by reference in its entirety.

STATEMENT REGARDING FEDERALLY SPONSORED RESEARCH OR DEVELOPMENT

This invention was made in part with government support under grant numbers CNS0751173, CNS0923479, CNS1012831, CNS1126478, and CNS1218700 awarded by the National Science Foundation. The government has certain rights in the invention.

BACKGROUND

This disclosure generally relates to a method and apparatus for wireless communications, and more particularly relates to a control channel design for many-antenna multi-user (MU) multiple-input multiple-output (MIMO) systems.

Many-antenna MU-MIIMO based communication faces a previously unaddressed challenge that it lacks a practical control channel. The potential range of MU-MIMO beamforming systems scales with up to the square of a number of antennas at a base station once the base station has channel state information (CSI). On the other hand, the range of traditional control channel operations remains constant since the control channel operations take place before or during CSI acquisition. The range gap between no-CSI and CSI modes presents a challenge to the efficiency and feasibility of many-antenna base stations.

Many-antenna MU-MIMO based communication represents a rapidly growing research field, which has recently shown promise of commercialization. However, there are still certain system challenges facing the creation of practical many-antenna base stations for many-antenna MU-MIMO wireless systems. One issue in current architectures is the lack of an efficient and reliable control channel that is required for various network operations. Wireless communication systems typically realize operations on the control channel using a single high-power antenna, or simple diversity schemes. However, these methods rapidly become very inefficient as the number of base-station antennas increases.

SUMMARY

Disclosed embodiments include a method for open-loop control operations performed by a serving many-antenna base station (BS). The method for open-loop control starts by encoding a beacon with an identified (ID) of the BS into a base sequence. The many-antenna BS generates a plurality of synchronization sequences by spreading the encoded base sequence with a set of orthogonal beam sequences. The many-antenna BS transmits, using a plurality of antennas, the plurality of synchronization sequences in a plurality of different beam directions determined by the orthogonal beam sequences, thus facilitating synchronization and association (and possibly other control operations) of users served by the many-antenna BS without any users' information at the BS.

Disclosed embodiments include a method for open-loop control operations performed by a user equipment (UE) served by the many-antenna BS. The method for open-loop control starts by receiving the plurality of synchronization sequences having different signal strengths and transmitted in different beam directions from the many-antenna BS. UE can utilize one of the received synchronization sequences to achieve time and frequency synchronization with the many-antenna BS. After synchronizing with the many-antenna BS, UE can decode, from the received synchronization sequence, a beacon with an identifier (ID) of the BS and performs an association procedure with the BS. LIE can also receive synchronization sequences from one or more other BSs in the neighborhood and perform synchronization/association with any of these BSs if the association with the original many-antenna BS is not fully completed. After performing synchronization and association with the BS, UE can also page the serving BS and request random access from the serving BS.

BRIEF DESCRIPTION OF THE DRAWINGS

FIG. 9 is an example table that shows analysis of a control channel overhead for a many-antenna MU-MIMO wireless communication system, in accordance with embodiments of the present disclosure.

FIG. 15 is flow chart illustrating a method that may be performed at a many-antenna base station of a many-antenna MU-MIMO wireless communication system, in accordance with embodiments of the present disclosure.

Figure 1:
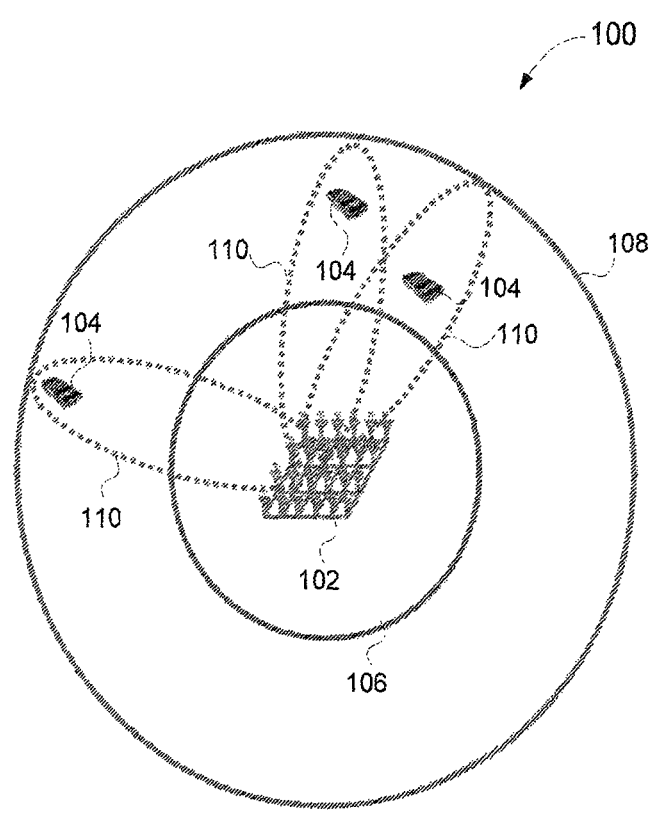
FIG. 1 is an example many-antenna multi-user multiple-input multiple output (MU-MIMO) wireless communication system, in accordance with embodiments of the present disclosure.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The techniques described herein may be used for various wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are created in the frequency domain with OFDM and in the time domain with SC-FDMA.

The teachings herein may be incorporated into (e.g., implemented within or performed by) a variety of wired or wireless apparatuses (e.g., nodes). In some embodiments, a node comprises a wireless node. Such wireless node may provide, for example, connectivity for or to a network (e.g., a wide area network such as the Internet or a cellular network) via a wired or wireless communication link. In some embodiments, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, or any other suitable device that is configured to communicate via a wireless or wired medium. According to certain embodiments of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain embodiments of the present disclosure, the access terminal may operate in accordance with the IEEE 802.11 family of wireless communications standards.

A multiple-input multiple-output (MIMO) base station (or access point) can have two modes of operation based on its knowledge of users' channel state information (CSI), i.e., the no-CSI mode occurring before the base station has the CSI knowledge for supported active users, and the CSI mode that utilizes a more efficient MIMO communication link between the base station and supported active users generated based on CSI collected at the base station. To collect CSI, the base station establishes time-frequency synchronization with supported users (or access terminals), and then receives uplink pilots back from the synchronized users. Furthermore, once a user becomes inactive, the base station can be configured to notify inactive user of an incoming transmission, i.e., the base station can page the inactive user, prompting the inactive user to send a pilot. All of these operations are part of a control channel, which is traditionally sent entirely during the no-CSI mode.

In MIMO wireless communication systems, the CSI mode has a gain of up to $M^2$ higher than the no-CSI mode, where M is a number of antennas at a base station. When M is small, as in current systems, one can overcome this gain gap by using a lower modulation rate or a coding gain in the no-CSI mode. However, as M increases, the gap between the CSI mode and the no-CSI mode quickly becomes large. In existing systems, all control channel operations are performed in the no-CSI mode and communicated omni-directionally to the entire coverage area. Thus, the base station's operational range can be limited by the no-CSI mode, which is significantly shorter than that of the CSI mode. One naive solution can be to employ a higher transmission power in the no-CSI mode in comparison with the CSI mode. However, this approach leads to a more expensive hardware (e.g., power amplifier at the base station with higher power consumption) and increased inter-cell interference.

Described embodiments include methods for control channel design that address the aforementioned gain gap for base stations (or access points) with a large number of antennas (e.g., many-antenna base stations). There are two key insights that are leveraged in the present disclosure. The first insight is that as much of a control channel as possible should be sent over the CSI mode. In accordance with embodiments of the present disclosure, control channel operations that utilize the no-CSI mode of a many-antenna base station are time-frequency synchronization, association, CSI collection, paging, and random access, which represent operations that are required to establish the CSI mode. By implementing the remaining control channel operations over the CSI mode, efficiency of the remaining control channel operations can be substantially increased and the aforementioned gain gap can be avoided. The second insight applied for control channel design in the present disclosure is that synchronization and association are not time-critical control channel operations. For example, synchronization can be valid for hundreds of ms, whereas association is performed only once. Thus, by reducing a frequency of performing synchronization operation, a channel overhead in the no-CSI mode associated with synchronization and association operations can be substantially reduced, at the cost of slightly increased association latency at cell edges.

Described embodiments include methods for open-loop beamforming and applying coding gains to ensure that many-antenna base stations can achieve their full potential range even in the no-CSI mode of operation. Through open-loop beamforming, control channel design presented in this disclosure is able to utilize the full diversity, power, and beamforming gains from all of antennas at a many-antenna base station, enabling the potential range to scale with a number of base station antennas (e.g., by a factor of M). Because there is a certain gap between the potential range of open-loop beamforming and the potential range of its MU-MIMO counterpart—closed-loop beamforming, coding gains can be employed in the present disclosure to further increase the potential range and to ensure that synchronization and paging are reliable even at cell edges. To be as efficient as possible, a many-antenna MU-MIMO wireless communication system that utilizes the control channel design presented herein performs only the aforementioned essential tasks and communications outside of the CSI mode, which offers much higher spectral capacity.

For some embodiments, a many-antenna base station of the MU-MIMO wireless communication system presented in this disclosure utilizes open-loop beamforming over the control channel in the no-CSI mode to sweep extra-long synchronization sequences across a coverage area. The synchronization sequences employed herein may enable users to establish time-frequency synchronization with the many-antenna base station, and may also encode the base-station identification (ID) for performing association. In one or more embodiments, the synchronization sequences transmitted from the many-antenna base station may further encode user IDs for performing simultaneous synchronization/association and paging.

For some embodiments, certain communication parameters may be dynamically configured, such as beam patterns, a sweep rate, and a synchronization sequence length to match a required gain for full coverage of a desired area. Furthermore, by increasing open-loop beamforming and coding gains in the no-CSI mode while reducing the modulation rate and/or number of users served in the CSI mode, the control channel design presented herein can be used to extend the range of the many-antenna base station in remote areas.

In accordance with illustrative embodiments, a many-antenna base station of an MU-MIMO wireless communication system that employs control channel design presented herein may communicate with users over a 2.4 GHz communication link using an array of 108 antennas to evaluate performance and control channel overhead. Conducted measurements presented in detail below show that the presented control channel design provides over a 40 dB gain compared to traditional control channel operations. As discussed in more detail below, this gain enables reliable synchronization to mobile users at over 250 meters while using less than 100 µW of transmission power per base station antenna, or approximately 10 mW of total base station transmission power, employing only standard low-gain 3 dBi omnidirectional antennas at the many-antenna base station. The presented design of control channel facilitates collecting high resolution channel measurements in highly mobile environments, with less than 0.5% channel overhead. To reduce the overhead of paging delay, a paging scheme is employed that leverages user's last known location for directing a paging signal.

FIG. 1 illustrates an example many-antenna MU-MIMO wireless communication system 100, in accordance with embodiments of the present disclosure. As illustrated in FIG. 1, a many-antenna base station 102 may comprise an array of large number of antennas (e.g., up to 108 antennas as described in the illustrative embodiment). The many-antenna base station 102 may employ the antenna array to communicate with a plurality of mobile users 104. As illustrated in FIG. 1, if users' synchronization is performed in traditional manner employing the no-CSI mode, a coverage range (i.e., gain) may be limited to a region 106 (e.g., cumulative gain for all users). The region (i.e., gain) 106 is substantially smaller than a region (i.e., gain) 108 that represents a coverage range of MU-MIMO communication in the CSI mode (e.g., cumulative gain for all users). As further illustrated in FIG. 1, closed-loop beamforming can be applied for MU-MIMO communication in the CSI mode for directing signal energy within a certain direction (e.g., beam 110) toward each user 104 when CSI related to that user 104 is known at the many-antenna base station 102.

For some embodiments, as discussed in more detail below, by applying open-loop beamforming in the no-CSI mode for synchronizing each user 104 with the many-antenna base station 102, a coverage gap (i.e., gain gap) between traditional no-CSI communication (e.g., region 106) and MU-MIMO communication (e.g., region 108) may be substantially reduced. The coverage region (i.e., gain) of the no-CSI mode can be further extended by applying coding gain, as also discussed in more detail below.

Beamforming and MU-MIMO

As illustrated in FIG. 1, beamforming may utilize multiple antennas of the base station 102 transmitting to the users 104 at the same frequency to realize directional transmission, i.e., transmission within regions of space (e.g., beams) 110. Constructive and destructive interference of signals from multiple antennas of the base station 102 may cause a signal strength received at a user 104 to vary spatially, leading to a beam pattern 110. The beam pattern 110 can be altered by changing beamforming weights applied to each antenna of the base station 102, effectively altering the amplitude and phase of the signal sent from that base station antenna.

In some embodiments, a many-antenna base station (e.g., the many-antenna base station 102 illustrated in FIG. 1) may employ open-loop beamforming for users' synchronization in the no-CSI mode. In this case, the many-antenna base station may utilize pre-computed beamforming weights (e.g., beamweights), such as Discrete Fourier Transform (DFT) based beamforming weights or Hadamard-based beamforming weights, to steer a beam in a desired spatial direction, without knowledge of the users' locations. On the other hand, the closed-loop or adaptive beamforming employs known CSI between the many-antenna base station and intended users to calculate the beamweights that maximize the signal strength at the intended users and minimize the interference of unintended users. In the case of closed-loop (adaptive) beamforming, the intended users may provide (e.g., via feedback channels) information about their locations and/or pilots to the many-antenna base station. Based on the provided users' locations and/or pilots, the many-antenna base station can estimate CSI related to the intended users and shape/steer beams of data towards the intended users.

The many-antenna base station 102 may utilize multiple antennas for serving multiple users simultaneously on the same time-frequency-code resources, typically through closed-loop beamforming. Each base station antenna may comprise its own radio (not shown in FIG. 1). For simplicity, the term antenna is used in the present disclosure to include both the radio and antenna. The spectral and energy efficiencies of MU-MIMO wireless communication systems (e.g., the MU-MIMO wireless communication system 100 illustrated in FIG. 1) grow with the number of base-station antennas (e.g., by the factor of M) and the number of concurrent users (e.g., by the factor of K), wherein M≥K. Hence, implementation of a very large number of base-station antennas has been advocated for some time, which is commonly referred to as "massive MIMO" and widely considered as one of the leading candidate technologies for $5^{th}$ Generation (5G) cellular networks. In the present disclosure, the term many-antenna is used to refer to a base station that has many more antennas relative to a number of users the base station serves.

For some embodiments, efficient channel estimation in many-antenna MU-MIMO wireless communication systems (e.g., the MU-MIMO wireless communication system 100 illustrated in FIG. 1) may require uplink pilots that are used to infer the downlink CSI via Time Division Duplex (TDD) reciprocity. Since channel estimates may be only ephemerally accurate, downlink beamforming may need to occur immediately after channel estimation. As a result, an efficient many-antenna MU-MIMO transmission frame structure may require several distinctive parts, i.e., beamsweeping, CSI collection, downlink communication and uplink communication, as illustrated in FIGS. 6A, 6B, 6C, and 6D and discussed in more detail below.

Control Channel Operations

In wireless communication systems (e.g., the many-antenna MU-MIMO wireless communication system 100 illustrated in FIG. 1), communication over a control channel may be employed to perform operations required to setup data communication. Operations performed over the control channel may include: synchronization, gain control, association, timing advance, random access, paging, setting modulation rates, gain control, scheduling, and so on. Additionally, the control channel may coordinate efficient CSI collection across many antennas from multiple users. Described embodiments support control channel operations required to establish an MU-MIMO channel, i.e., synchronization, association, CSI collection, random access, and paging. Remaining control channel operations may be performed over the established MU-MIMO channel.

Since nodes (e.g., the mobile users 104 shown in FIG. 1) in wireless networks do not share oscillators, their time-frequency reference is subject to drift. Thus, all high-performance digital wireless communication schemes require time-frequency synchronization. The users 104 may establish time-frequency synchronization based on several operations. First, a user (e.g., any mobile user 104 shown in FIG. 1) may auto-correlate a received signal for frame detection and coarse timing. Then, the user may perform automatic gain control (AGC) to ensure the received signal is within an appropriate dynamic range of an analog-to-digital converter (ADC) employed at the user's equipment. Next, the user may perform a cross-correlation with a pre-known sequence to achieve fine-grained time synchronization. Finally, the user may leverage a distortion within the known signal, i.e., phase shift, to recover a frequency offset and establish frequency synchronization.

For example, in 802.11-based wireless communication systems, a user continuously performs an auto-correlation to detect a short training sequence (STS) at a beginning of a packet, which triggers AGC. Then, the user performs a cross-correlation on a following long training sequence (LTS) for time synchronization. Similarly, in Long Term Evolution (LTE) based wireless communication systems, a user continuously performs an auto-correlation to detect a cyclic prefix of each symbol. Then, the user performs a cross-correlation on a Primary Synchronization Signal (PSS) and a Secondary Synchronization Signal (SSS) for time synchronization. Typically, reference symbols can be transmitted throughout a frame to maintain the synchronization, as well as to compensate for other channel effects.

For certain embodiments, before a user (e.g., any of the mobile users 104 shown in FIG. 1) can transmit or receive data, the user first identifies nearby base stations, selects one base station, and then connects to (i.e., associates with) that selected base station (e.g., the base station 102 wireless communication systems in FIG. 1). To facilitate the association procedure, each base station transmits a unique identifier (e.g., a beacon) at a regular interval. Each user scans for base stations (e.g., for beacons transmitted from base stations), often over multiple frequencies, then chooses one base station to associate with based on specific criteria, such as a signal strength and authorization. Then, the user contacts the selected base station, usually leveraging the same mechanism as random access, to request and coordinate access, e.g., authorization, encryption, and scheduling.

To obtain CSI, a transmitter (e.g., the base station 102 illustrated in FIG. 1) may send a pre-known sequence (e.g., a pilot), which a receiver (a mobile user 104 shown in FIG. 1) may use to compute an amplitude and phase shift for each subcarrier channel. However, this approach requires time-frequency synchronization, since without time synchronization the receiver would not reliably know where the pilot starts, and without frequency synchronization there would be an inter-subcarrier interference that causes inaccurate channel estimation.

Traditional MU-MIMO wireless communication systems employ explicit CSI estimation, i.e., a base station may send pilots from each base-station antenna, and users may estimate CSI to each base-station antenna and then send the CSI estimation back to the base-station. For example, in Carrier Sense Multiple Access (CSMA) systems, CSI collection may be performed at a beginning of every transmission frame, whereas in scheduled systems (e.g., LTE systems) CSI collection may be performed continuously using reference symbols from each base-station antenna. However, these techniques do not scale well as a number of antennas and users increase. Because of that, emerging many-antenna systems typically employ implicit CSI estimation, i.e., each user may send an uplink pilot that a serving base station receives on every antenna, which provides an uplink CSI; the base station may then leverage reciprocal calibration to estimate a downlink CSI based on the known uplink CSI.

Additionally, the control channel of MU-MIMO wireless communication system may handle notifying users when the users have incoming data, which is referred to as paging in the present disclosure. Furthermore, a base station may utilize the control channel to coordinate users to randomly access a network when the users have outgoing data, which is referred to as random access in the present disclosure. Both paging and random access may need to occur before CSI is acquired, because a user needs to be paged before sending pilots and the user needs to notify the base station that it has outgoing data so the base station knows to estimate a channel associated with the user.

Gain Gap Between CSI and No-CSI Modes

Figure 2:
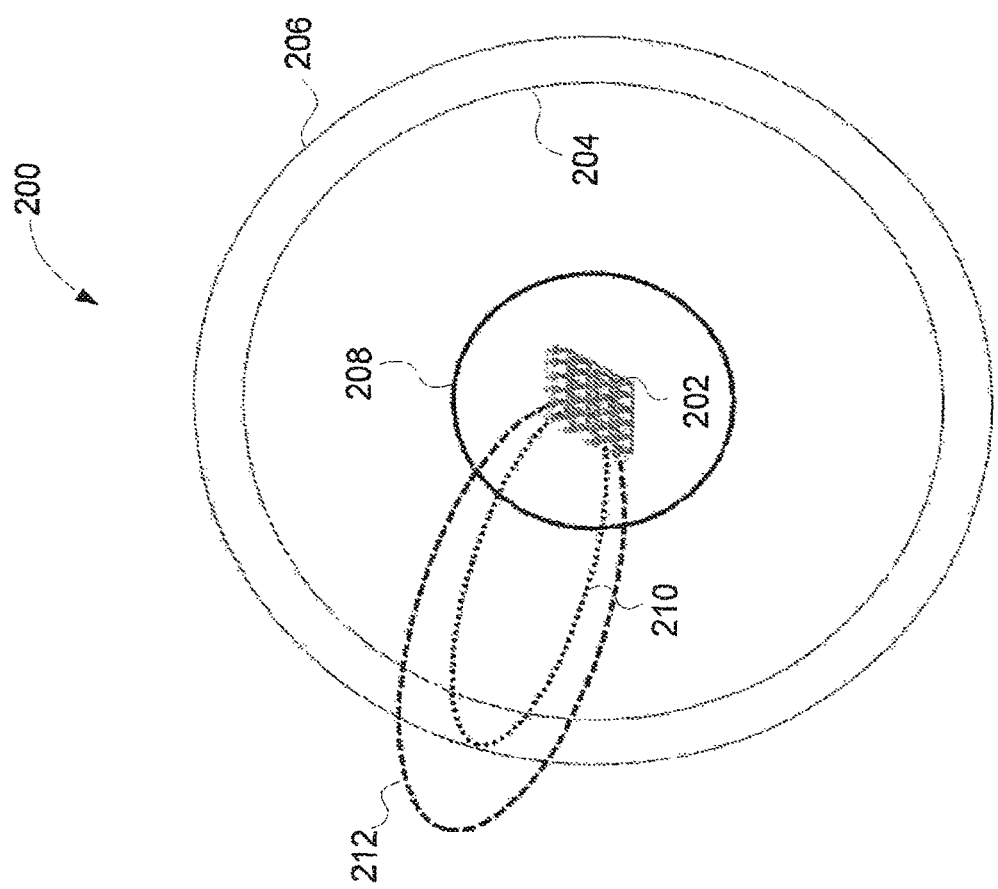
FIG. 2 is an example many-antenna base station operating in different modes, in accordance with embodiments of the present disclosure.

Many-antenna base stations can operate in two modes: with knowledge of CSI (e.g., in CSI mode) or without knowledge of CSI (e.g., in no-CSI mode). FIG. 2 illustrates an example wireless communication system 200 where a many-antenna base station 202 can operate in different modes, in accordance with embodiments of the present disclosure. With CSI knowledge (e.g., in the CSI mode), the many-antenna base station 202 can achieve a gain of $M^2$ (where M is a number of base-station antennas) relative to a peak-power of a single antenna, which is illustrated by a coverage region 204. The largest gain can be achieved in the CSI mode when the many-antenna base station 202 utilizes closed-loop beamforming when communicating to a single user, which is illustrated by a coverage region 206.

On the other hand, without CSI knowledge (e.g., in the no-CSI mode), the many-antenna base station 202 may only have a gain of one for some control channel operations, which is illustrated by a smaller coverage region 208. Hence, a significant gain gap exits when operating the base station in the CSI mode and in the no-CSI mode. Furthermore, while a wireless communication channel can be reciprocal for uplink and downlink transmissions, a transceiver hardware is not (e.g., a transceiver hardware at the many-antenna base station 202), which subsequently creates another gain gap between uplink and downlink communication modes.

By employing open-loop beamforming in the no-CSI mode, a coverage region (i.e., gain) per user is shown in FIG. 2 as a beam pattern space region 210. In some embodiments, as discussed in more detail below, a coverage region (i.e., gain) can be increased by applying coding gain on top of open-loop beamforming, leading to an extended coverage region per user, which is shown in FIG. 2 as a beam pattern space region 212.

Figure 3:
FIG. 3 is an example table showing analytical results of gains and gain gaps for different modes of operation of the many-antenna base station illustrated in FIG. 2, in accordance with embodiments of the present disclosure.

FIG. 3 is an example table 300 showing analytical results of gains and gain gaps for different modes of operation of a many-antenna base station (e.g., the base station 202 illustrated in FIG. 2), in accordance with embodiments of the present disclosure. Table 300 summarizes the analytical results for no-CSI and CSI modes of operations for both downlink and uplink communications when an M antenna base station (e.g., the many-antenna base station 202 illustrated in FIG. 2) serves K single-antenna users. In one or more embodiments, each base-station antenna has a (peak) transmit power of $P_{BS}$ and each user antenna has a (peak) transmit power of $P_U$. For simplicity, average channel and antenna gains are normalized to 1, since they are constant across all modes of operation, and include any non-reciprocal hardware effects, such as gains from low-noise amplifiers (LNAs) in an appropriate transmit power, e.g., the peak transmit power for each user antenna $P_U$ includes the gain from the base station's LNAs.

It should be noted that there is no existing scheme which performs better than a single antenna for the no-CSI mode control channel operations of synchronization and channel estimation. Thus, the no-CSI mode has a gain of 1, which becomes $P_{BS}$ and $P_U$ for downlink and uplink, respectively, as shown in the table 300 in FIG. 3. The gain of A antenna base station in the no-CSI mode can be dependent on what operation the base station is performing. For example, for CSI collection, there is a fundamental gain limitation of 1 because CSI only comprises information about a link between one antenna and another antenna. Therefore, signals received at other antennas do not comprise information about that link's CSI. On the other hand, this theoretical limitation does not exist for synchronization, as a desired signal can be transmitted from all base-station antennas, which is exploited herein.

While there are no-CSI mode techniques that achieve a theoretic gain of M, these methods are either impractical, or, in fact, reduce the performance of time-frequency synchronization. One naive approach would be to use a radio frequency (RF) combiner to merge the power output of the M base-station antennas to a single antenna. However, this is difficult and expensive to implement in hardware, as it requires perfect phase matching to avoid feedback to the antennas and complex wiring. Furthermore, by applying this approach, the diversity gain of M antennas is lost since only a single high-power transmitter is effectively employed, i.e., a system is no longer M×K system. Another approach can be to apply cyclic delay diversity (CDD), which cyclically rotates symbols by different amounts of time from each antenna. The CDD spreads the power output of all M antennas spatially, and can be considered as arbitrarily beamforming on different subcarriers. However, the CDD causes time-domain distortion, which substantially degrades the performance of existing synchronization techniques. Furthermore, the performance of CDD degrades rapidly as more antennas are added. It should be also noted that both of the aforementioned approaches may only provide a certain gain in a downlink, and do not provide any gain in an uplink.

It is well known that the potential power gain of an M×K MU-MIMO system with CSI, in both uplink and downlink, is equal to P·M, where P is a transmission power. Leveraging CSI, a base station of the MU-MIMO wireless communication system can direct radiation towards, or listen to radiation from, intended K users using beams with an approximate width of 1/M, which provides a spatial power gain of M. In the downlink, the base station transmits power from all M antennas, but splits the power among K users, thus providing a per-link power of $P_{BS}$·M/K, for equal power allocation among the users. In the uplink, the base station receives power from each user on all M antennas, thus providing a per-link power of $P_U$. This renders a total gain of $M^2 \cdot P_{BS}/K$ for the downlink and $M \cdot P_U$ for the uplink, as shown in the table 300 in FIG. 3. It should be noted that a MU-MIMO base station capable of serving K users likely will not always serve K users simultaneously; with a single user the gap between the CSI mode and the no-CSI mode for the downlink increases to a full $M^2$.

Control Channel Design for Gain Matching

Described embodiments include methods to bridge the aforementioned gain gaps by designing a control channel that overcomes limitations of no-CSI operational mode. To bridge the gain gap between the no-CSI mode of operation and CSI mode of operation in the downlink, the control channel design presented herein may combine open-loop beamforming with a coding gain. For some embodiments, a many-antenna base station of a many-antenna MU-MIMO wireless communication system (e.g., the many-antenna base station 202 illustrated in FIG. 2) may sweep open-loop beams carrying orthogonal sequences, which enable synchronization and paging operations. In the uplink, the control channel design presented in this disclosure exploits the natural per-antenna asymmetric transmit power and employs an additional coding gain to enable CSI collection and random access operations. Furthermore, by encoding a base-station ID in the downlink synchronization sequence and exploiting the random access operation, the control channel design presented herein facilitates the association operation.

Open-Loop Beamforming

In some embodiments, open-loop beamforming may be employed over the control channel in the no-CSI mode to exploit the power and diversity of all antennas at a many-antenna base station (e.g., the base station 202 illustrated in FIG. 2). The combined power of the base station antennas provides a gain of M, whereas the beamforming provides another gain of M, for a total gain of $O(M^2)$. However, the beamforming gain focuses the radiated power on 1/M of the antennas' coverage area. Thus, the many-antenna base station (e.g., the many-antenna base station 202 illustrated in FIG. 2) must sweep beams to provide complete coverage. Since the association and synchronization are delay-tolerant, the control channel design employs open-loop beamforming and beamsweeping for the association and synchronization operations without impacting user-perceived performance or creating significant channel overhead.

While there are many MIMO and diversity schemes that exploit the gains from multiple antennas, only open-loop beamforming can be effective for time-frequency synchronization, as it provides the full potential combined power and directivity gain from all of the available antennas without causing time-domain distortion. Furthermore, open-loop beamforming may have several practical benefits in MU-MIMO wireless communication systems. First, the increased received power may allow a user to employ cheaper RF components, e.g., the LNA. Second, the increased directivity and lower total power may reduce the interference to adjacent cells. Third, the open-loop beamforming does not require any additional hardware or computation, as the beamforming precoders are already required to be applied at a many-antenna base station for MU-MIMO communication. Fourth, the open-loop beamforming allows the coverage area to be finely tuned.

Figure 4:
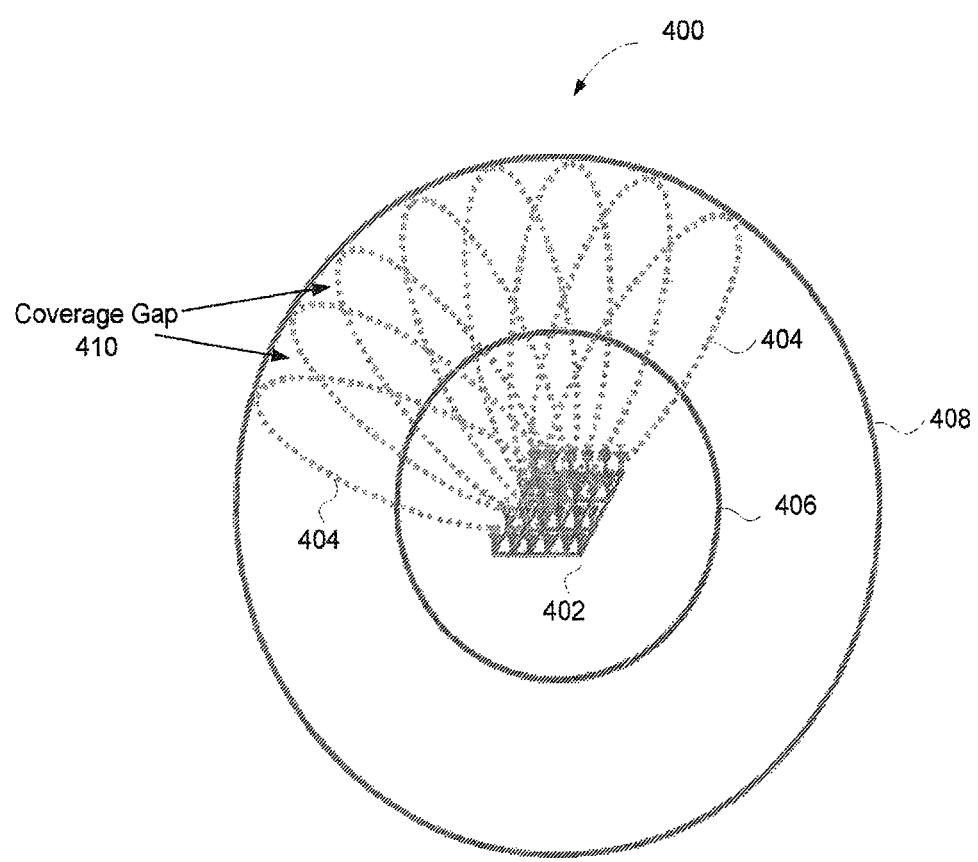
FIG. 4 is an example many-antenna base station that may perform open-loop beamforming, in accordance with embodiments of the present disclosure.

FIG. 4 illustrates an example 400 of a many-antenna base station 402 that performs open-loop beamforming for users synchronization, in accordance with embodiments of the present disclosure. To overcome the spatial selectivity of open-loop beamforming, the many-antenna base station 402 may employ beamsweeping that transmits a signal, s, in different spatial directions using beamforming. Fundamentally, beamsweeping trades off increased spatial coverage with additional time overhead. Since, as discussed above, some control channel operations are delay-tolerant, beamsweeping can be applied for synchronization, as well as to facilitate association.

For some embodiments, each beam (e.g., beam 404 illustrated in FIG. 4) can be defined by a M×1 vector, $b_n$, wherein an N length sweep pattern can be defined by a M×N matrix, B, composed of $b_1, b_2, \ldots, b_n$ vectors. The M-antenna base station 402 may transmit an entire sweep pattern in N time-slots, as the transmission in a given time-slot n and given base station antenna m is $s \cdot B_{m,n}$. Thus, if each beam 404 is sent contiguously, the beamsweeping takes N times longer than a single omnidirectional transmission of the same sequence. In one or more embodiments, the many-antenna base station 402 may send a beam at a beginning of each frame. In this case, the entire beamsweep may have a duration of N·F, where F is the frame duration.

If the M×N matrix B forms an orthogonal basis, i.e., the matrix B consists of N=M orthogonal or pseudo-orthogonal beams, then complete spatial coverage may be provided. In one or more embodiments, any complete M-dimensional basis used for beamsweeping may provide complete coverage of the CSI space, since, by definition, the CSI of any user can be represented by a linear combination of the basis. This ensures that, for any given point in the coverage area, at least one beam in B will not have a perfect null.

It should be noted that as the number of base station antennas M increases, the probability that a user detects a given beam is reduced, since the energy is more spatially selective. However, the probability that a user will detect at least one beam in the sweep pattern increases, as, given a complete orthogonal basis, at least one beam is pointed towards the user, wherein that beam has a higher Effective Isotropic Radiated Power (EIRP) since the beam is narrower.

The control channel design presented herein that can be employed in many-antenna MU-MIMO systems can leverage many beamforming techniques with compelling tradeoffs for specific implementations. Without detailed information about the environment and precise calibration, any orthogonal basis with a low peak to average power ratio (PAPR) can be suitable for open-loop beamforming. While a complete basis guarantees spatial coverage, it does not guarantee a strong signal. Since it is statistically impossible that every user will have an open-loop beam pointed directly at that user, the gain of beamsweeping may be reduced by an inaccuracy factor of a, i.e., to $M^2/a$. As such, an overcomplete B, i.e., for N>M, can provide extended coverage by statistically reducing the inaccuracy factor of a. Otherwise, given careful consideration of the propagation environment and antenna placement, as well as hardware calibration, techniques such as DFT open-loop beamforming can be tuned to provide a desired coverage area. In one or more embodiments, Hadamard beamforming weights may be utilized.

In some embodiments, an order of beamsweeping can be selected such that a latency of reaching a user is reduced. For example, if the beamsweeping order is continuously left to right (or vice versa), then it may take a longer time on average for the beam to reach the user. However, if the beamsweeping is performed by hopping from one portion of space around a base station to another, i.e., beamsweeping is performed starting from the left portion of space followed by the right portion, followed by the front portion and then the back portion, the average latency of reaching the user can be reduced.

In some embodiments, a coverage area can be increased when utilizing non-repeating beamsweeping pattern. A many-antenna base station can be configured to continuously change a beam during the beamsweeping process. In this way, the many-antenna base station may cover more space than that when using a fixed beamsweeping pattern.

Coding Gain

For certain embodiments, the use of open-loop beamsweeping can reduce the gain gap between no-CSI and CSI modes. As illustrated in FIG. 4, gain of traditional no-CSI mode without beamsweeping is given by a coverage region 406, which is substantially smaller (e.g., by a factor of $M^2$) than a coverage region (gain) 408 of MU-MIMO CSI mode. By employing the open-loop beamsweeping in no-CSI mode, the gain gap from the CSI mode can be substantially reduced. As illustrated in FIG. 4, a cumulative gain (coverage region) of open-loop beamsweeping is given by inclusion of all beams of space 404 covering N different beam directions. However, as shown in FIG. 4, there is still a coverage gap 410 between the no-CSI open-loop beamsweeping and the CSI MU-MIMO communication.

To close the remaining gap between the no-CSI mode and the CSI mode, the many-antenna MU-MIMO system of the present disclosure additionally employs, in the no-CSI mode, a variable coding gain in both the downlink and uplink communications. In some embodiments, a coding gain can be achieved by sending a signal over a longer period of time, thus, a total received power, integrated over time, may increase linearly as the duration increases. However, the coding gain may come at a cost of linearly increasing a channel usage overhead. For some embodiments, coding gains are preferred methods for tuning the gains to match between operation modes because the coding gains are adjustable and thus can be used to dynamically fine-tune the gain vs. overhead tradeoff.

Figure 5:
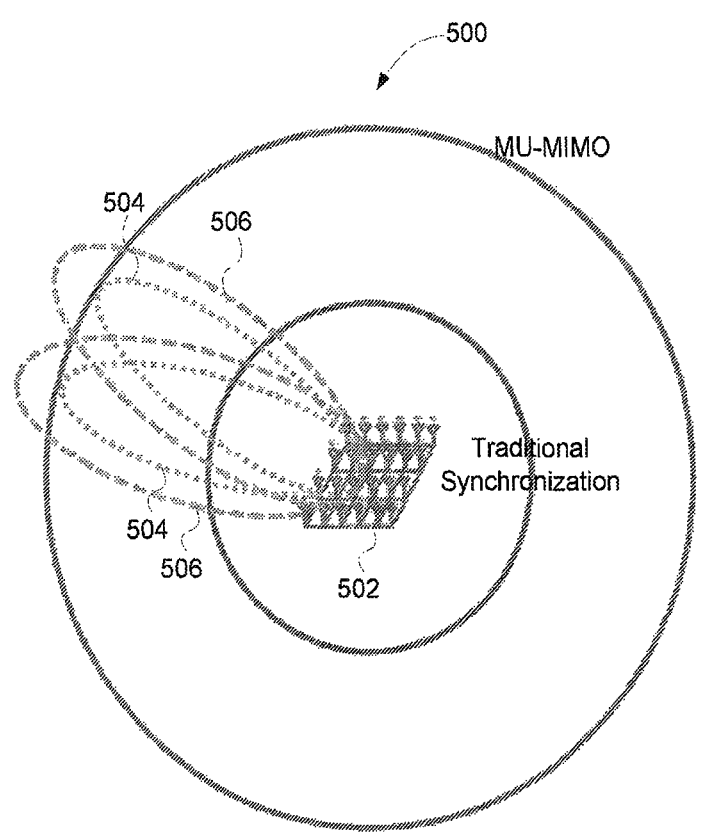
FIG. 5 is an example many-antenna base station that may perform open-loop beamforming with applied additional coding gain, in accordance with embodiments of the present disclosure.

FIG. 5 illustrates an example 500 of a many-antenna base station 502 that performs open-loop beamforming with applying additional coding gain, in accordance with embodiments of the present disclosure. As illustrated in FIG. 5, by applying the coding gain in the downlink, a coverage region (i.e., gain) per beam may be increased from a coverage region 504 (e.g., the coverage region when only the open-loop beamsweeping is applied) to a coverage region 506 (e.g., the coverage region when coding gain is combined with open-loop beamsweeping). Thus, by combining the open-loop beamsweeping with the coding gain, the coverage gap 410 illustrated in FIG. 4 may be completely eliminated, and the full coverage can be achieved in the downlink.

Referring back to FIG. 3, while table 300 analyzes the gain gap in terms of signal-to-interference-plus-noise ratio (SINR), it should be noted that not all parts of the frame have the same SINR requirements. For example, data transfer can benefit from a higher SINR by altering the modulation and coding scheme. Higher-order modulation requires a higher SINR to be successfully decoded, thus the higher-order modulation can be considered as a negative coding gain in the CSI mode. For example, in 802.11-based systems, Orthogonal Frequency Division Multiplexing (OFDM) binary phase shift keying (BPSK) modulation may require 15 dB SINR, whereas 64-QAM may require 31 dB. In contrast, the detection threshold for a length 128 Kasami sequence is approximately −5 dB. This effectively further reduces the gain gap between the CSI mode used for data transmission and no-CSI mode, but the gain gap reduction is dependent on actual data modulation rate. By leveraging a dynamic coding gain, the range and overhead of the many-antenna MU-MIMO system of the present disclosure can be tuned to the specific needs of each deployment.

Figure 6A:
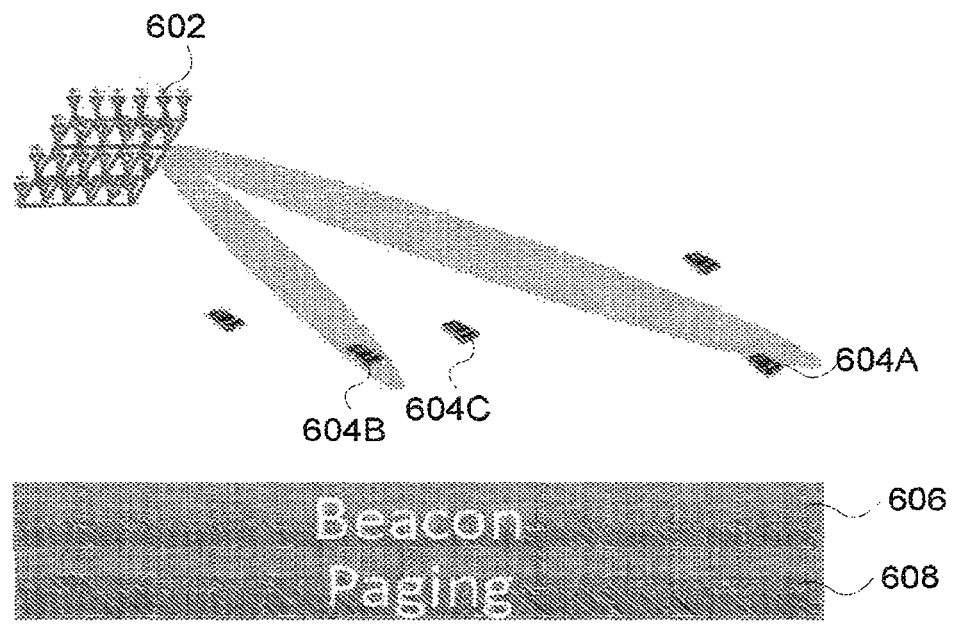
FIGS. 6A, 6B, 6C, and 6D are examples of different frame structures for different operations of a many-antenna base station in a many-antenna MU-MIMO wireless communication system, in accordance with embodiments of the present disclosure.

FIGS. 6A, 6B, 6C, and 6D illustrate examples of different frame structures for different operations of a many-antenna MU-MIMO wireless communication system, in accordance with embodiments of the present disclosure. For some embodiments, as illustrated in FIG. 6A, a many-antenna base station 602 may transmit (e.g., using a downlink control channel) to a user 604A variable length orthogonal synchronization sequences (e.g., beacons 606) that may also encode the base-station ID. As further illustrated in FIG. 6A and discussed in more detail below, the many-antenna base station 602 may transmit (e.g., simultaneously with beacon) a paging sequence 608 for paging another user 604B different than the user 604A that performs synchronization with the many-antenna base station 602.

The many-antenna base station 602 may simultaneously provide synchronization and achieve a gain, $C_{down}$, proportional to the length of the synchronization sequence. Since the synchronization sequences need to be detected prior to synchronization, the synchronization sequences require low streaming auto-correlations, both with themselves and the other sequences in the orthogonal set. That is, since the synchronization sequences must be detectable without knowledge of when they start, a receiver (e.g., the user 604A in FIG. 6A) may need to perform a full correlation at every sample. Thus, a time-shift of the synchronization sequences may need to produce a low correlation; otherwise it may cause an erroneous detection.

Figure 6B:
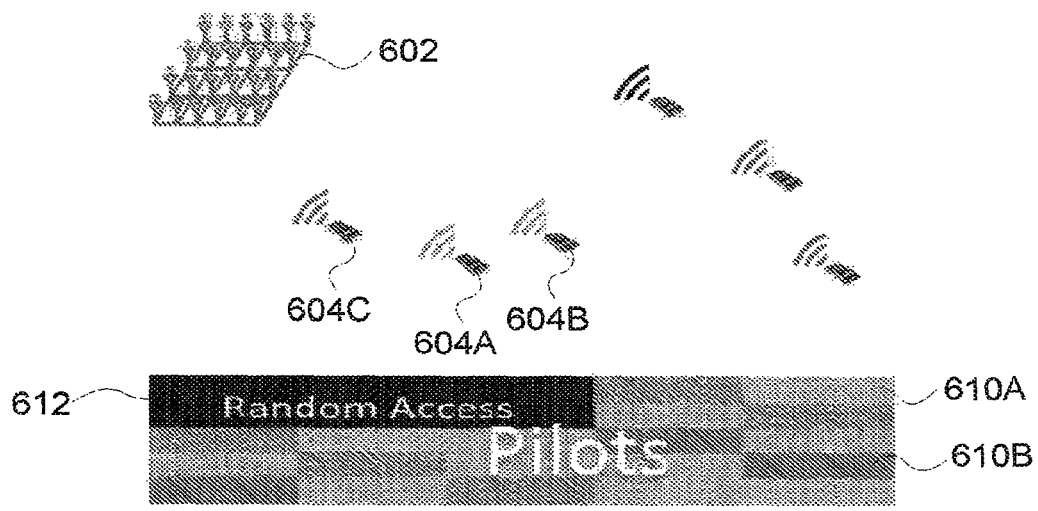
Figure 6C:
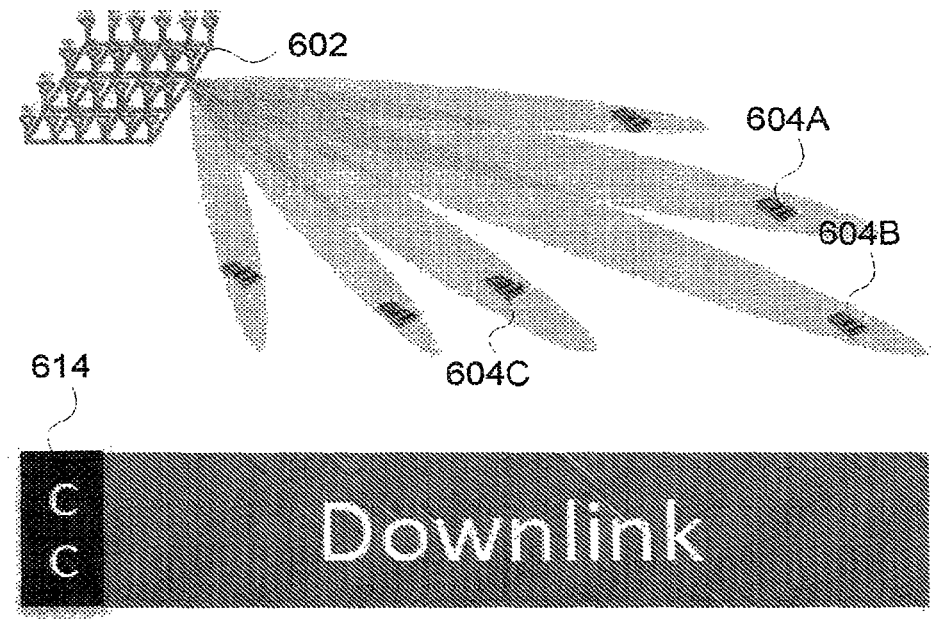
Figure 6D:
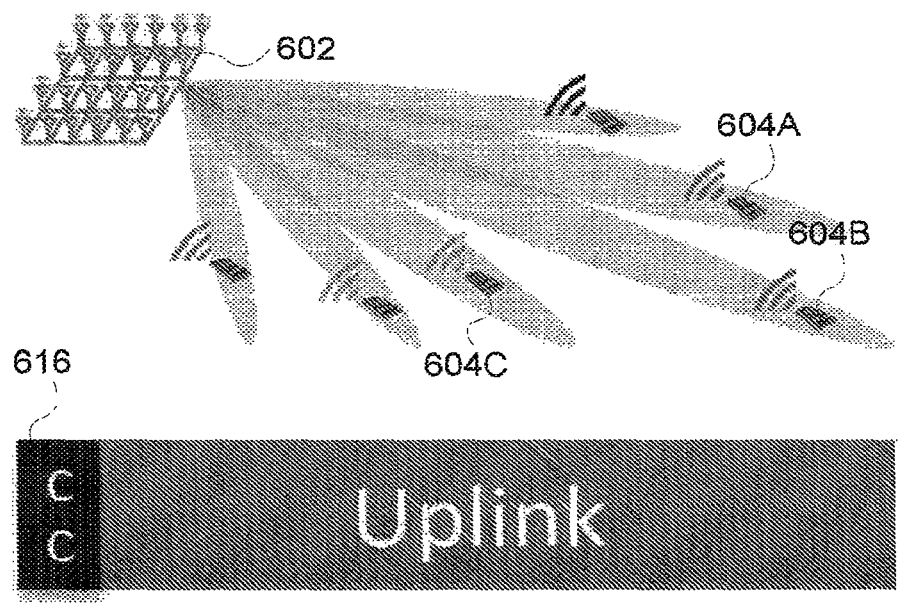

For some embodiments, after synchronization as illustrated in FIG. 6B, the many-antenna base station 602 may assign orthogonal pilot slots 610A, 610B to active users 604A, 604B, 604C, etc., and may reserve dedicated uplink pilot slots 612 for association and random access (e.g., CSI collection). In one or more embodiments, the uplink pilot slots may be of variable length to enable a coding gain based on users' channel quality, e.g., users on cell edges may utilize longer pilots to increase the accuracy of channel estimation. For some embodiments, as illustrated in FIG. 6C and FIG. 6D, the many-antenna base station 602 may leverage the acquired CSI to provide downlink and uplink connectivity to users 604A, 604B, 604C, etc., as well as any remaining control channel information over the efficient MU-MIMO communication link.

For some embodiments, by orthogonalizing pilots in frequency, the control channel design is able to increase the accuracy of channel estimation, and provide an uplink gain of at least K. Frequency orthogonalization (e.g., Orthogonal Frequency-Division Multiple Access (OFDMA)) may enable all users to transmit simultaneously, which increases the instantaneous power received at the many-antenna base station by a factor of K. To collect complete CSI for every frequency, users can be further time orthogonalized, as shown in FIG. 6B, i.e., orthogonal pilots 610A, 610B may be allocated to different users 604A, 604B, 604C, etc. and simultaneously transmitted in uplink. As such, the total power received for a given user, integrated over time, also increases by a factor of K. To obtain accurate CSI, each user may be required to send a pilot for at least a duration of the inverse of the frequency coherence, every coherence time interval. However, by scheduling users with poor channel quality to send even longer than required by the frequency coherence interval, the coding gain, $C_{up}$ may be increased. This approach ensures high-quality channel measurements across the entire cell and fully closes the gain gap, as illustrated in FIG. 5.

In one or more embodiments, for association and random access, users may send orthogonal synchronization sequences on dedicated time-frequency blocks during the training phase. This may allow the users to still achieve a coding gain, while simultaneously enabling collision avoidance and timing-advance estimation, as discussed in more detail below.

Combined Gain

For some embodiments, as discussed, combination of open-loop beamforming and coding gain may be employed over a control channel in many-antenna MU-MIMO system to close the gain gap, as illustrated in FIG. 5. In one or more embodiments, beamsweeping may provide the majority of downlink gain by focusing the full power of a many-antenna base station on a small portion of the coverage area, i.e., the open-loop beamsweeping may achieve a gain of $M^2/a$, where a is the beamforming inaccuracy. In the downlink, the control channel design reduces the gap between no-CSI and CSI modes of operation from $M^2/K$ to $M^2/K/(C_{down} \cdot M^2/a) = a/(C_{down} \cdot K)$, thus the coding gain can be tuned so that $C_{down} \approx a/K$. In the uplink, the control channel design leverages OFDMA and coding to achieve a gain of $C_{up} \cdot K$ in the no-CSI mode. This reduces the no-CSI to CSI gap from M to $M/(K \cdot C_{up})$, which suggests $C_{up}$ should be approximately $M/K$ to close the gap.

However, once a proper downlink coding gain, $C_{down}$, is applied, combined with open-loop beamsweeping, the no-CSI downlink gain is $M^2/K$. In contrast, the no-CSI uplink gain is only $(C_{up} \cdot K \cdot P_U)$, which leads to a new gain gap. To mitigate the uplink-downlink gap, the total transmission power of the base station and user need to be approximately the same, e.g., $O(P_U) \approx O(M \cdot P_{BS})$; this is typical of existing bidirectional communication systems, though macro cells can have as high as a 10 to 18 dB difference. This reduces the gap from $(C_{up} \cdot K \cdot P_U)/(M^2/K \cdot P_{BS})$ to $(C_{up} \cdot K^2)/M$, and suggests that the uplink coding gain should be tuned to approximately $M/K^2$, along with any residual discrepancy between $P_U$ and $P_{BS}$, to finish closing the gap.

Comparing the uplink coding gain $C_{up}$ needed for closing the gap in no-CSI vs. CSI, i.e., M/K, and the uplink coding gain $C_{up}$ needed for closing the gap in uplink vs. downlink, i.e., $M/K^2$, it can be observed that there is a residual gap of K. Since the range of the base station is limited by the downlink mode, $C_{up}$ should be selected, for certain embodiments, to match the uplink-downlink gap. Then, the residual gain of K in the CSI uplink can be used to reduce transmission power or increase modulation rate. In one or more embodiments, full coding gain can be only required at cell edges, where users utilize extra-long pilots. It should be also noted that the many-antenna MU-MIMO system presented herein, for a given coverage area, reduces the required per-antenna transmission power of the base station by $M^2$ and of the user by K.

Control Channel Design

Described embodiments relate to a control channel design and the usage of control channel for synchronization, association, CSI collection, random access, and paging, as will be discussed in more detail below.

Synchronization

The many-antenna MU-MIMO system presented herein achieves both time synchronization and frequency synchronization. In some embodiments, the synchronization can be achieved based on extended-length sequences transmitted from a many-antenna base station to a mobile user by employing beamsweeping.

Figure 7:
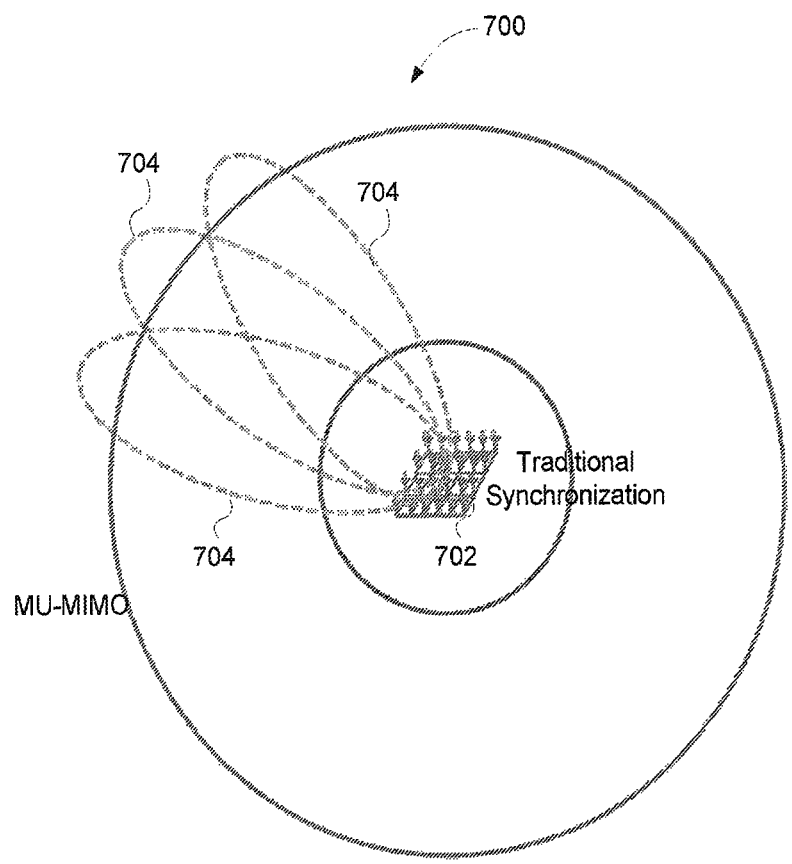
FIG. 7 is an example many-antenna base station transmitting a synchronization sequence (e.g., beacon) by employing beamsweeping and coding, in accordance with embodiments of the present disclosure.

FIG. 7 illustrates an example 700 of a many-antenna base station 702 transmitting a synchronization sequence by employing beamsweeping, in accordance with embodiments of the present disclosure. As illustrated in FIG. 7, the many-antenna base station 702 may be configured to transmit the synchronization sequence using N different beam directions 704. For some embodiments, users may perform a streaming cross-correlation on received samples to detect the synchronization sequence sent from the base station 702. Each user may compute the correlation of the received signal R with the sequence S, i.e., $\Sigma_{i=1}^{n}(R_{i-1} \cdot S_i^*)$, at every sample. The correlation may produce a peak at the single sample when R and S are aligned in time, i.e., time-synchronized.

The control channel design presented herein faces two main challenges. First, multiple synchronization sequences may need to be detected simultaneously since both beacon and paging sequences may be used for synchronization, which are sent simultaneously on separate beams. Second, time synchronization needs to be performed without coarse timing information or AGC. As discussed above, coarse frame detection and AGC may be employed in the CSI mode to achieve fine-grain time synchronization. However, these techniques are inefficient or even impossible to employ in the no-CSI mode since the beamsweeps and MU-MIMO downlink are highly spatially selective and, therefore, users receive every synchronization sequence with highly varying power. The many-antenna base station 702 may be configured to precede transmission of every synchronization sequence with transmitting a training sequence to facilitate coarse frame detection and AGC. However, the training sequence may need to have significantly increased length to overcome the gain gap. Moreover, the gains set by this training sequence would only be valid for a single beam, making it highly inefficient for beamsweeping.

Described embodiments address the aforementioned challenges based on three techniques discussed in more detail herein. Firstly, for some embodiments, two full-precision correlators may be employed for performing the streaming cross-correlation on received samples. By performing two parallel full-precision correlations, e.g., 12-bit correlations, the many-antenna MU-MIMO system presented herein may reliably detect synchronization sequences with highly varying signal strengths, as well as reliably distinguish paging and beacon synchronization sequences that are sent simultaneously.

Secondly, for some embodiments, since performing AGC on every sequence is inefficient, transmit gain control may be employed. Since the many-antenna base station 702 beamsweeps the synchronization sequence, a user receives every sequence with a substantially different signal strength. Therefore, users may wait for a sequence in the sweep that is within the users' dynamic range. If the users do not detect any sequences, e.g., before discovering any base stations, the users may slowly vary their receive gain settings until they detect sequences. The gain settings can be modified such that to increase a number of synchronization sequences and beacons falling within the users' dynamic range. After synchronization is established, the users may listen to all of the subsequent synchronization sequences and adjust their gain accordingly. In one or more embodiments, the many-antenna MU-MIMO system presented herein performs uplink gain control by using feedback, whereas fine-grain downlink gain control may be performed at the beginning of each downlink phase, as illustrated in FIG. 6C and FIG. 6D with segments 614, 616.

Thirdly, for some embodiments, a detection threshold may be set dynamically by combining a running average of the correlator output and a spike detector. This is because, without traditional AGC, the single-sample correlation peak may vary drastically in magnitude. The average correlator output may provide the average input power, but may be additionally scaled by the power of the correlation sequence so that different sequences can be detected without adjusting the detection threshold. In one or more embodiments, the spike detector may simply raise the detection threshold exponentially when there is a short burst of power, thus avoiding erroneous false-positives.

For some embodiments, to determine a carrier frequency offset (CFO), a user may calculate a phase drift in the received downlink synchronization sequence. In one or more embodiments, the downlink synchronization sequence may comprise two repetitions of the same sub-sequence; since the drift from CFO is constant, corresponding received samples in each repetition have the same phase offset. That is, for an n length sub-sequence repeated twice to form the synchronization sequence S, $\theta(S_i, S_{i+n})=\theta(S_j,S_{j+n})$, where $\theta$ is the phase difference between a pair of complex samples the synchronization sequence S. This is because $S_i$ and $S_{i+n}$ are complex samples of the same symbol. Thus, in the absence of CFO, $\theta(S_i,S_{i+n})=0$. With CFO, there is a phase drift that is proportional to time n, which is thus constant across all complex samples i, i.e., $\theta(S_i,S_{i+n})=\text{drift}(n)$. Therefore, CFO may be computed as:

$$CFO = \frac{1}{2\pi \cdot n}\sum_{i=1}^{n} \theta(S_i, S_{i+n}). \quad (1)$$

In one or more embodiments, the division by $2\pi$ indicated in equation (1) is not performed since the CFO is multiplied by $2\pi$ when generating the correcting complex sinusoid. Thus, by selecting n to be a power of 2, the division in equation (1) becomes a simple bit-shift operation. In an embodiment, in the presence of noise, longer synchronization sequences may become more reliable, as the noise can be filtered out by the averaging operation. The technique for frequency synchronization presented herein enables two synchronization sequences to be simultaneously transmitted (e.g., during beamsweeping) without affecting CFO recovery. Since both simultaneously transmitted synchronization sequences comprise sub-sequences that repeat twice, the combined signal also repeats twice and can still be used to accurately calculate CFO. In some embodiments, if there is no other sequence being sent simultaneously with the synchronization sequence, CFO can be calculated without employing the repetitions of the synchronization sequence.

To avoid frequency distortion in multipath environments, a cyclic prefix may be prepended to the synchronization sequence. However, the prepended cyclic prefix may make time synchronization less robust, as the cyclic prefix can cause false positives in the correlator, since the cyclic prefix aligns with a subset of the sequence. To avoid this, a cyclic postfix may be employed, but then the CFO calculation may be delayed accordingly, i.e., the sum in equation (1) may start at a length of the cyclic postfix. It should be noted that this approach does not affect the correlator performance, as the correlator operates in the time-domain.

Association Procedure

The presented many-antenna MU-MIMO wireless system enables association by: (i) encoding a unique base-station identifier (e.g., beacon) in the beamswept synchronization sequence, (ii) having users scan for the encoded beacons to select a base station, and (iii) providing a "soft" association mechanism that allows users to quickly obtain more information about the selected base station over a MIMO link. More details about each operation are provided herein.

For some embodiments, every base station may beam-sweep a synchronization sequence that encodes a locally unique identifier, called a beacon, as illustrated in FIG. 6A and discussed above. This approach may enable users to simultaneously synchronize with a base station, as well as to identify the base station. For the sake of brevity, the base stations are considered to be coordinated so that they each have locally unique identifiers and can ensure that their beacons do not overlap in time, which prevents random access collisions and reduces pilot contamination.

For some embodiments, before associating, a user may listen for at least one entire sweep interval (possibly on multiple frequencies) to determine the IDs of all nearby base stations, as well as the average power of the beacons from each base station. Since the beacon is beamformed, its received power does not indicate an actual channel quality between the user and the base station. Thus, the user may need to listen to beacons for an entire sweep interval to obtain a rough estimate of the signal strength from each base station. However, the true SINR and channel quality cannot be accurately determined until after association due to the beamforming inaccuracy discussed above. Furthermore, the unique identifier contained in the beacon may not convey any additional information, such as authentication, encryption, and a human-readable identifier (e.g., a Service Set Identifier (SSID)). Therefore, in or more embodiments, the user may be configured to soft-associate to multiple base stations to search for the best match.

Since the beacons implemented herein may only contain a unique identifier, the additional mechanism called soft-association may be provided that enables users to gather more information over the CSI mode. Traditional control channel designs broadcast information about a base station within beacons. For example, 802.11-based beacons may include the Basic Service Set Identifier (BSSID), SSID, modulation rate, encryption information, and the like. This information can be utilized by each user to determine if the user wants to, or even can, connect to the base station. Moreover, the user may need to be able to judge its channel quality to the base station, which can only be performed in the CSI mode.

For some embodiments, the soft-association mechanism implemented herein may enable users to quickly and efficiently establish a MIMO link with the base station to efficiently exchange control channel information. To perform the soft-association, each user may need first to synchronize with the base station by successfully decoding a beacon. After that, the user may send a pilot in one of the slots reserved for random access, as discussed in more detail below. Once the base station successfully receives the pilot, the base station has information about CSI for that user, and may use the CSI information to open a MIMO link and convey the remaining control channel information to the user. If the user proceeds with a full association (e.g., based on authorization, link quality, and the like), the base station may schedule user-dedicated pilot slots and a unique paging sequence to maintain the link with the user. Otherwise, the user may continue to scan for and soft-associate to other base stations in the neighborhood before associating with only one base station.

Collecting CSI

For some embodiments, after beacon detection, all active users may send uplink pilots in their scheduled slots, as illustrated in FIG. 6B. Then, the base station may utilize the received uplink pilots to collect CSI related to channels between the base station and the users. The CSI collection phase may comprise a number of time-frequency-code resource slots that can be arbitrarily assigned to users, with some resource slots dedicated to random access (e.g., slot 612 illustrated in FIG. 6B), including association requests and paging responses. For supporting the association requests and paging, the random access slot 612 can be divided between an association slot and random access. In one or more embodiments, users that send reference signals in a given resource element may gain spatial resource elements in the corresponding time and frequency coherence interval for both the uplink and downlink phases. Based on this, any given reference symbol may provide an estimation that is valid both for the coherence time interval, as well as for a wider frequency coherence interval. For certain embodiments, longer pilot slots may be assigned to users having quality of channels below a certain threshold to improve CSI accuracy.

Random Access

As illustrated in FIG. 6B, disclosed embodiments include a method for random access based on reserving pilot slots at the beginning of each channel estimation phase (e.g., the random access slot 612 illustrated in FIG. 6B). To initiate a connection with the many-antenna base station 602, users 604A, 604B, 604C, etc. may send an uplink pilot in one of these reserved pilot slots. For the user 602 to send uplink pilots within correct pilot slots, without interfering with other users, the user 602 may need to have successfully received a beacon, and thus established synchronization with the many-antenna base station 602. In one or more embodiments, the base station 602 may utilize the received uplink pilot(s) to estimate the user's channel, as well as timing advance, and create a highly efficient MU-MIMO link to the user. The created MU-MIMO link may be then used to convey all remaining control channel information, including modulation rates and pilot scheduling, as well as maintain/improve synchronization for active users if the beacon has not been received for a pre-determined time period. In some embodiments, the conveyed control channel information may comprises at least one of: BSSID, SSID, a modulation rate, gain control information, channel estimation information related to the MU-MIMO communication link, or encryption information associated with the many-antenna base station.

LTE wireless communication standard specification provides the compelling random access solution which can be suitable for the many-antenna MU-MIMO system presented herein, with the exception that the many-antenna MU-MIMO system presented herein allows for longer length sequences to be employed to finely tune the gain gap. As specified by the LTE, the many-antenna MU-MIMO system presented herein may also employ, for random access, collision detection and avoidance, as well as timing advance.

Paging

Described embodiments enable a many-antenna base station of the many-antenna MU-MIMO system presented herein to reliably and quickly page users across an entire coverage area of the many-antenna base station. To accomplish this, the beamsweeping and coding gains described above can be applied. However, unlike synchronization and association, paging is not delay tolerant operation. Because of that, the many-antenna base station may utilize the users' last known location to substantially reduce the delay from beamsweeping.

Figure 8:
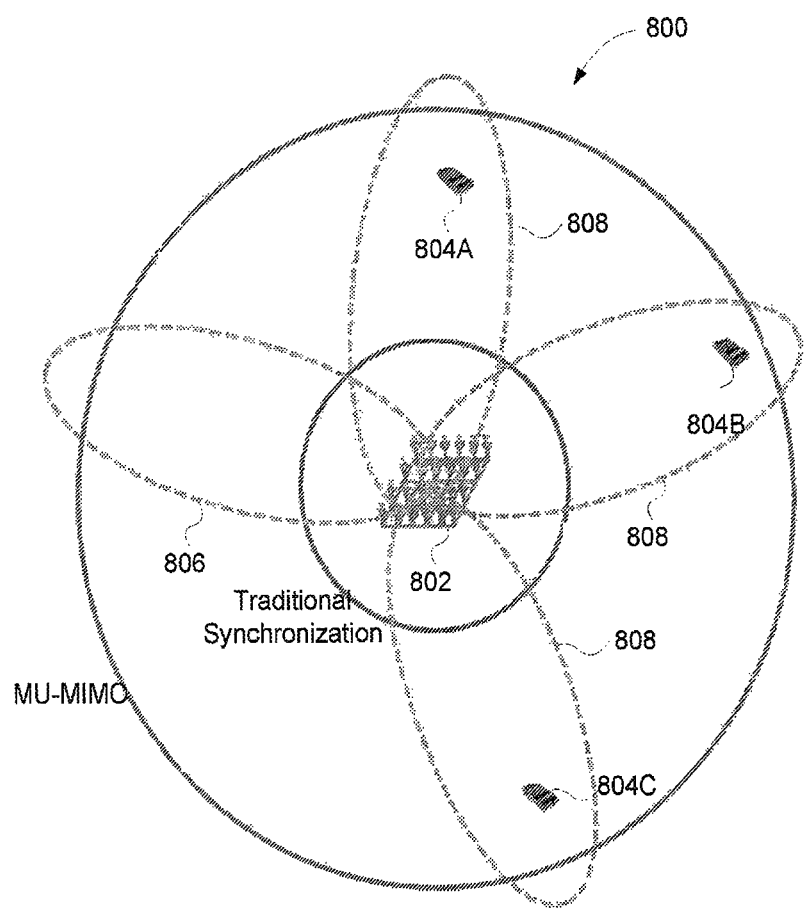
FIG. 8 is an example many-antenna base station that simultaneously performs synchronization and paging of users, in accordance with embodiments of the present disclosure.

FIG. 8 illustrates an example 800 of a many-antenna base station 802 that performs paging of users 804A, 804B, 804C, in accordance with embodiments of the present disclosure. Upon association, the base station 802 may assign each user a unique paging sequence. This paging sequence may be constructed and transmitted almost identically to a beacon and simultaneously with the beacon, as illustrated in FIG. 6A. As also illustrated in FIG. 8, the many-antenna base station 802 may transmit a beacon 806 for synchronization (e.g., using beamsweeping) simultaneously with transmitting paging sequences 808 to the users 804A, 804B, 804C that are already synchronized and associated with the many-antenna base station 802.

For some embodiments, the paging sequence (e.g., the paging sequence 808) may be chosen from the same codebook as the beacon (e.g., the beacon 806) to ensure orthogonality. Furthermore, the paging sequence may be repeated twice to facilitate time-frequency synchronization. To page a user, the base station (e.g., the base station 602 illustrated in FIG. 6A, the base station 802 illustrated in FIG. 8) beamsweeps, along with a beacon (e.g., beacon 606 shown in FIG. 6A, beacon 806 shown in FIG. 8), a unique paging sequence (e.g., paging sequence 608 shown in FIG. 6A, paging sequence 808 shown in FIG. 8) associated with the user at the beginning of each frame, but on a separate beam, as illustrated in FIG. 6A and FIG. 8. This additional spatial separation between the beacon and the paging sequence may improve the detection of either, as it reduces the inter-sequence interference. In one or more embodiments, to detect the paging sequence (e.g., paging sequence 608 in FIG. 6A, paging sequence 808 in FIG. 8), users (e.g., users 604A, 604B, 604C in FIGS. 6A, 6B, 6C, and 6D, users 804A, 804B, 804C in FIG. 8) may perform the same synchronization correlation used for the beacon (e.g., beacon 606 in FIG. 6A, beacon 806 in FIG. 8), described above. Successful detection of the paging sequence similarly provides the user with synchronization. However, in the case of detecting a paging sequence, the user may be configured to immediately send an uplink pilot in the previously dedicated (e.g., upon association) random access pilot slot. The transmission of uplink pilot may allow the base station (e.g., the many-antenna base station 802 in FIG. 8) to estimate CSI and begin MIMO communication with the paged user (e.g., the user 804A in FIG. 8).

In some embodiments, each paging sequence is transmitted to a corresponding user until the many-antenna base station 802 receives an acknowledgement from the user that the paging sequence is successfully received. The beacon 806 and the paging sequences 808 can be successfully detected at the corresponding users as the beacon 806 and the paging sequences 808 and their beam directions are pseudo-orthogonal. In an embodiment, the repetition of the beacon 806 and the paging sequences 808 can be implemented to assist the users in recovering CFO during overlapped paging and beacon sequences. In another embodiment, the beacon 806 and the paging sequences 808 can be transmitted at separate time frame(s). In this case, it is not required to repeat the beacon 806 and the paging sequences 808 to recover CFO at the users, as a phase drift within the beacon sequence 806 and the paging sequences 808 can be detected without interference.

While association and synchronization are not time-sensitive, the delay from beamsweeping may be unacceptable for paging. Therefore, in some embodiments, the many-antenna base station 802 may utilize the knowledge of the user's prior location (e.g., last known location of the user 804A) to guide the beamsweep, which can significantly speed up paging operation. It should be noted that leveraging the user's last known location can only improve expected paging delay, as the sweep continues until the user is paged. In some embodiments, the user's location information may comprise at least one of: a physical location of the user, CSI associated with the user, information about strengths of one or more beacons received at the user (e.g., information about a strongest beam of the beacon sweep received at the user), an angle of arrival of the strongest beacon received at the user, or any other information that can facilitate steering the transmission beam from the many-antenna base station 802 to that particular user.

Additionally, or alternatively, the users 804A, 804B, 804C may periodically send a random access request (e.g., polling) to the many-antenna base station 802. This approach may serve multi-purpose of maintaining the association, checking for missed page requests, and updating the users' last known location at the many-antenna base station 802 to assist with efficient paging and inter-base station handovers.

Disclosed embodiments further include methods for optimizing the beacon sweep and paging search using historical user information for a given deployment. For example, over time, a base station can learn that users are never in certain deployment positions in space (e.g., up in the sky), and the base station can be configured to not sweep beams toward these specific positions in space or to sweep the beams less frequently. Similarly, the base station can learn that users have typical movement patterns. Thus, if a user does not respond to a paging sequence sent from the base station, the base station can be configured to perform the beam sweep for sending the paging sequence towards anticipated user locations instead of all possible directions. The anticipated user locations can be based on at least one of: a last known physical location of a user, CSI associated with the user, information about strengths of beacons received at the user, information about a strongest beam of the beacon sweep received at the user, an angle of arrival of the strongest beacon received at the user, and the like.

Disclosed embodiments further include methods for synchronization and association of multi-antenna users during no-CSI operational mode of the many antenna base station. In some embodiments, each multi-antenna user can receive samples of a synchronization sequence on multiple beamforming streams. Then, multiple correlations (e.g., streaming cross-correlations or autocorrelations) can be performed on the samples of the synchronization sequence on the multiple beamforming streams to decode a beacon with an identification of the many-antenna base station that is encoded into the synchronization sequence. In some other embodiments, a synchronization sequence can be detected on any antenna of a multi-antenna user based on an auto-correlation or cross-correlation at a low threshold. After that, beamforming weights can be computed based on the detected synchronization sequence. A subset of the samples of the synchronization sequence can be then processed based on streaming cross-correlations or autocorrelation on multiple user antennas using the computed beamforming weights to decode a beacon with an identification of the many-antenna base station that is encoded into the synchronization sequence. In some embodiments, the beamforming weights can be pre-determined, and may comprise at least one of Hadamard-based beamforming weights or DFT-based beamforming weights.

Overhead Analysis

The control channel design presented in this disclosure may have a small, if not negligible, overhead. For some embodiments, this overhead can be measured by four metrics: (i) total channel overhead, (ii) association delay, (iii) random access delay, and (iv) paging delay. FIG. 9 provides equations 900 for determining these overheads and delays. Table 910 given in FIG. 9 provides example values for illustrative system configurations. For this analysis, it can be assumed that frames are transmitted continuously, with a beacon at the beginning of each frame. The expected paging delay is dependent on the paging scheme. However, the expected paging delay is upper-bounded by the association delay, as that is how long it takes to perform a full beam-sweep.

For some embodiments, active users do not need to receive valid beacons to maintain synchronization, as the synchronization can be maintained in the CSI downlink control phase. Inactive, but associated users can also maintain synchronization by listening for beacons and paging signals. The duration that time-frequency synchronization is valid may depend on the accuracy of the oscillators, frame design (e.g., cyclic prefix), as well as fluctuations in temperature. Given the typical accuracy of oscillators, the synchronization can be valid for hundreds of ms, but this can be determined on a per-system basis. As such, beacons may be only needed for association, and thus the sweep interval can be adjusted accordingly. In one or more embodiments, the overheads shown in FIG. 9 can be tuned by changing the system parameters. It should be note that, per table 910 in FIG. 9, the control channel design presented in this disclosure can support thousands of antennas with less than 2% overhead, at the cost of slightly increased association delay at the cell edges.

Implementation

In accordance with some illustrative embodiments, the control channel design presented herein may be implemented on a prototype of a many-antenna MU-MIMO base station that comprises an array of 108 antennas, although more antennas may be also supported. The illustrative embodiments employ Hadamard beamweights for beam-sweeping. The Hadamard beamweights use a minimal number of weights to provide a complete, perfectly orthogonal, basis, which may enable a full diversity gain and provide complete spatial coverage with the minimal amount of overhead. Further, the Hadamard beamweights may feature a preferred peak-to-average power ratio (PAPR) of 1, which may allow the base station antennas to use their full potential transmit power. Additionally, calculating the Hadamard beamweights does not require any knowledge of the antenna aperture or environment, enabling rapid deployment without calibration or environmental considerations.

The illustrative embodiments utilize Kasami sequences for the downlink coding. Kasami sequences may provide desired detection performance, and may have low, bounded, streaming correlation both with themselves and other orthogonal sequences. This allows the Kasami sequences to be reliably detected without time synchronization. Moreover, the Kasami sequences may provide a large number of orthogonal sequences, e.g., 4096 for a length 256 Kasami sequence, which enables co-located users and base stations to be uniquely identified.

The illustrative embodiments use Zadoff-Chu sequences for the uplink channel estimation coding. The Zadoff-Chu sequences have a constant amplitude and thus have a preferred level of PAPR. Furthermore, the Zadoff-Chu sequences can be used to detect multiple users' random access requests simultaneously, along with each users' path delay to estimate timing advance, with small computational overhead. Variable length Zadoff-Chu sequences may be employed herein to match gain requirements, as well as for CSI estimation.

The illustrative embodiments support a real-time streaming time-domain correlator for the beacon, paging, and synchronization, which creates a very strong single-sample peak when the correct sequence is detected. As such, the performance range and accuracy is highly dependent on the detection threshold. Since gain control for the beacon or paging code is not performed in the present disclosure, the detection threshold is set dynamically based on the input power. In addition, the detection threshold may increase during power surges to avoid false-positives. Furthermore, the dynamic detection threshold can be scaled by a constant, which may be controlled by a computer-programmable software code. The dynamic detection threshold can be further optimized to increase range, particularly with mechanisms to avoid false positives.

Performance Results

The performance of control channel design presented herein for many-antenna MU-MIMO systems are evaluated regarding synchronization, beacons, and paging in diverse environments for bridging the gain gap between the CSI mode and no-CSI mode of operation. The results presented herein demonstrate that the presented control channel design can extend the no-CSI mode range by over 40 dB when compared to traditional control channels. Furthermore, by leveraging knowledge of the user's previous location paging delay can be improved by 400%, and CFO of over 10 kHz can be reliably corrected.

The performance of control channel design presented in this disclosure are tested in 100 discrete user locations at varying distances from the base station in indoor environments and an anechoic chamber. Due to hardware availability, and for testing the performance of different antennas, the presented control channel design is employed with three separate antenna configurations: (i) in the anechoic chamber with 80 directional 6 dBi patch antennas, (ii) indoors and outdoors with 104 omnidirectional 3 dBi monopole antennas, and (iii) indoors with 108 omnidirectional 3 dBi monopole antennas. In all configurations the users also leveraged the 3 dBi omnidirectional antennas (e.g., one antenna per user).

At each location, the control channel system presented herein is tested over a 20 MHz bandwidth at 2.4 GHz and the performance are analyzed with regard to the accurate detection of the beacon, paging signal, and uplink pilot, which demonstrate performance of the control channel design in the no-CSI mode. As a control, an unbeamformed beacon and paging signal are additionally sent from each base-station antenna, i.e., "beamsweep" is performed by applying the identity matrix, in both low and high-power modes using a 64 length code to compare the performance with traditional single antenna systems and the naive high-power solution discussed above. While the implemented control channel design is capable of running in real time, the implementation briefly pauses after every beam to collect performance statistics from the nodes, such as successful detections, false positives, and received signal strength indicators (RSSIs). Because of this measurement delay, the experiments are conducted without mobility, in relatively stationary channels. The obtained results are used to analyze the performance of the presented control channel design beacon, paging, and CSI collection vs. traditional methods. Additionally, a controlled experiment is setup to test the performance of the CFO estimator.

Figure 10:
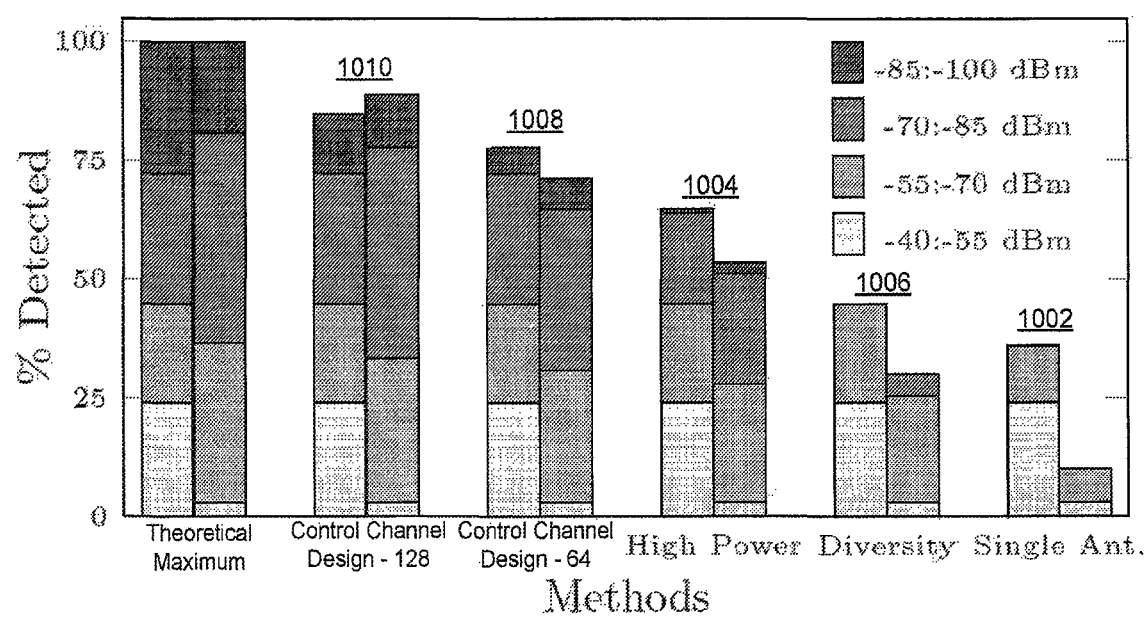
FIG. 10 is an example graph illustrating beacon detection performance for synchronization and association of users in a many-antenna MU-MIMO wireless communication system, in accordance with embodiments of the present disclosure.
Figure 11:
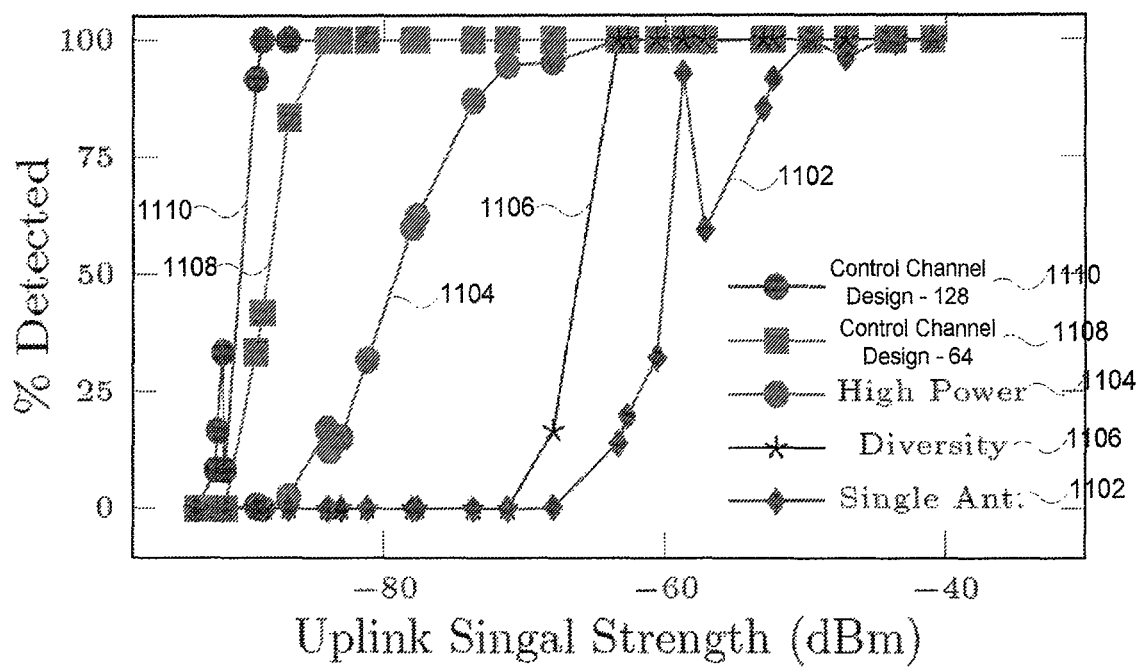
FIG. 11 is an example graph illustrating beacon detection performance for synchronization and association of users in a many-antenna MU-MIMO wireless communication system versus an uplink signal strength, in accordance with embodiments of the present disclosure.

FIGS. 10 and 11 show the probability of successfully receiving the base station's beacon, i.e., the synchronization sequence encoded with the base-station ID, with various configuration parameters. In FIGS. 10-11, single-antenna transmission, both high power (e.g., bars 1002 in FIG. 10, plot 1102 in FIG. 11) and low power (e.g., bars 1004 in FIG. 10, plot 1104 in FIG. 11), can be compared with diversity transmission (e.g., bars 1006 in FIG. 10, plot 1106 in FIG. 11) and the presented control channel design with code lengths of 64 (e.g., bars 1008 in FIG. 10, plot 1108 in FIG. 11) and 128 (e.g., bars 1010 in FIG. 10, plot 1110 in FIG. 11). In the case of single antenna diversity mode, the base station rotates which antenna is transmitting, thus exploiting the full diversity of the array. This approach is equivalent to the presented control channel design using the identity matrix for beamsweeping.

FIGS. 10 and 11 sort the results based on the average uplink CSI signal strength across all base-station antennas for the given location, which is an approximation of distance and a fair metric for coverage area. It should be noted that downlink RSSI is not a good metric, since it varies per-beam. In addition, distance is not a good metric since scatterers can significantly alter signal strength. Clearly, changing uplink transmission power will simply shift the same plots shown in FIG. 11 either left or right, which indicates how code length and both uplink and downlink transmission powers should be balanced in a real system.

The results across all locations are illustrated in FIG. 10, with separate bars for the 36 anechoic chamber locations (left bars) and 64 indoor locations (right bars), including 104-antenna locations and 108-antenna locations. It can be observed in FIG. 10 that in indoor locations the presented system (e.g., left bars 1010, 1008) is able to reliably serve significantly more locations than the traditional control channel (e.g., left bar 1006 for diversity scheme) and a single high power antenna system (e.g., left bar 1002). Even when users have over a −70 dBm average RSSI to the base station, they miss almost 25% of the beacons sent with the high-power single-antenna scheme (e.g., see left bars 1004). This is due to multipath; in some locations, even fairly close, two paths can destructively interfere and create a null, which is not easily overcome with additional signal strength. While the diversity scheme (e.g., see bars 1006) performs better than the single antenna (e.g., see bars 1002), the diversity scheme is still unable to reliably receive many beacons where users have lower than −70 dBm uplink RSSI. This illustrates the necessity of the control channel design presented in this disclosure, which leverages both the power and diversity of the entire array, in many-antenna MU-MIMO systems (e.g., see beacon detection performance denoted with bars 1008 and 1010 in FIG. 10).

FIG. 11 illustrates beacon detection performance results from the anechoic chamber. Since there is no multipath in the anechoic chamber, the detection rate of each technique is very closely related to RSSI, thus these results accurately demonstrate the relative performance of each technique. It can be observed from FIG. 11 that the presented control channel design (e.g., plots 1108 and 1110) is able to outperform a single-antenna scheme (e.g., plot 1102) by over 40 dB, and the high-power scheme (e.g., plot 1104) by 20 dB.

To demonstrate the ability of the presented control channel design to leverage location information to accelerate paging, a simple scheme is tested where the paging sweep is guided based on the intended user's last location. The experiments are performed on the 108-antenna base station configuration in the last 44 locations. Mobile users are paged based on each beam's detectability, which is determined by the correlation magnitude to threshold ratio.

Figure 12:
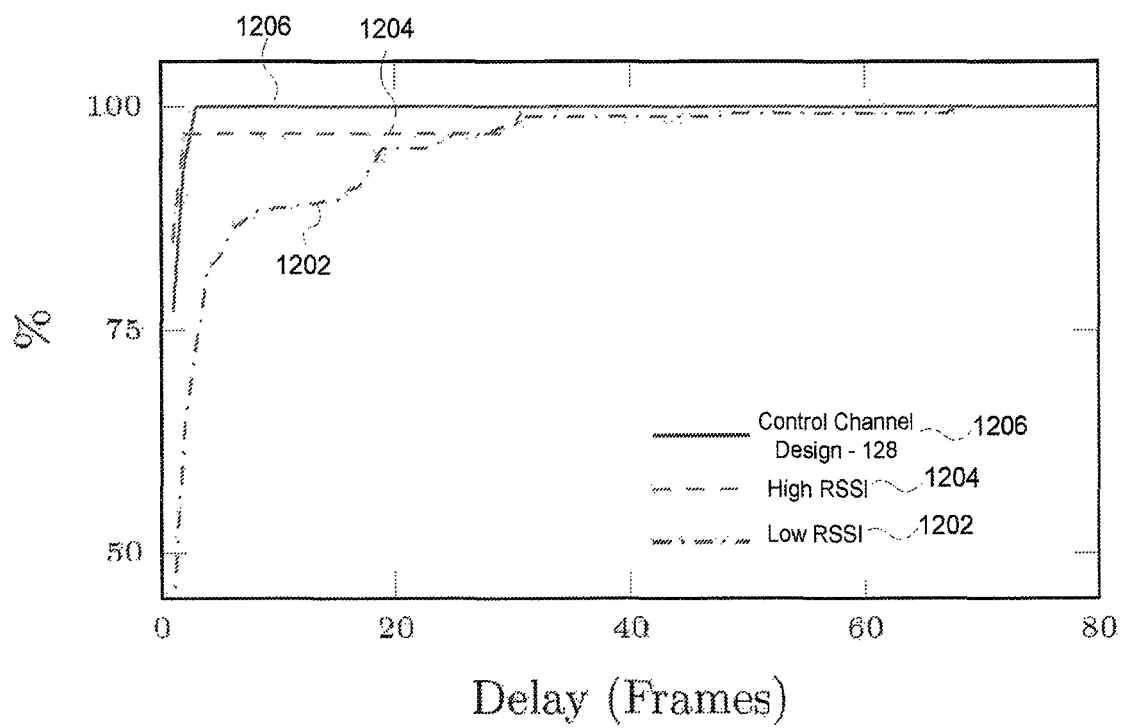
FIG. 12 is an example graph illustrating cumulative distribution functions of paging delay in a many-antenna MU-MIMO wireless communication system, in accordance with embodiments of the present disclosure.

It is determined that the base state employing the presented control channel design is able to successfully page 94% of users by the second frame, compared to only 70% without leveraging the user location, as illustrated in FIG. 12. When users are near the base station, the users receive the majority of the beams in a sweep, and thus optimizing based on the users' location does not provide much benefit, as shown by the low RSSI plot 1202. However, the paging delay is reduced from an average of 4.8 frames to 1.2 frames, an improvement of 4 fold, and a worst-case improvement of 68 frames to 3 frames (plots 1202 and 1204 vs. the presented control channel design illustrated by plot 1206).

While successful detection of a beacon or paging sequence inherently provides time-frequency synchronization, to more accurately test the accuracy of the presented CFO correction, a more controlled experiment is setup herein. A reference clock is shared between the base station and user, effectively removing CFO, and the user is placed at 0.5 m from the base station. Then, a controlled CFO is induced in the beacon sequence by multiplying it with a complex sinusoid ranging from −10 kHz to 10 kHz. To measure the performance vs. coding gain and SNR, beacons of length 64 and 128 are sent, and attenuators are used at the base station to reduce the transmission power from −12 dBm to −42 dBm. These attenuations resulted in the user receiving roughly −60 dBm (High), −75 dBm (Mid), and −90 dBm (Low) RSSIs. The cumulative distribution of the error magnitude of the CFO estimates is presented in FIG. 13. For clarity, the results presented in FIG. 13 are derived from a single estimation; however multiple estimates can be employed to reduce the error by an order of magnitude.

Figure 13:
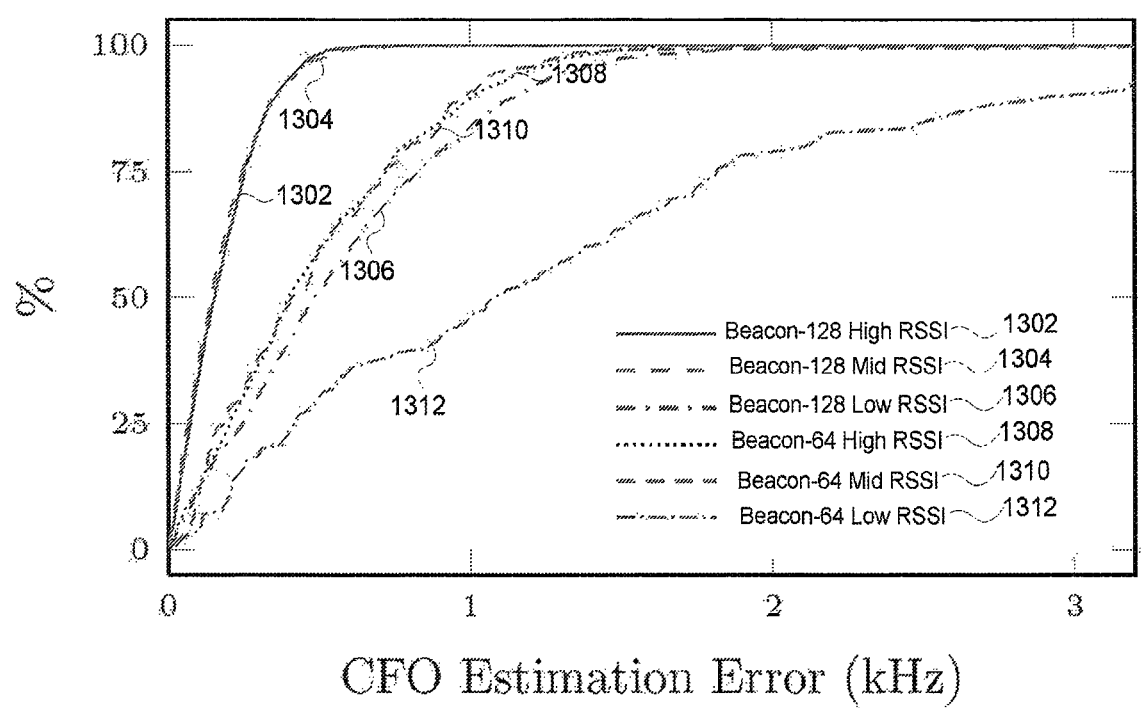
FIG. 13 is an example graph illustrating cumulative distribution functions of a carrier frequency offset (CFO) estimation error in a many-antenna MU-MIMO wireless communication system, in accordance with embodiments of the present disclosure.

It can be observed from FIG. 13 that with mid and high RSSI the presented system is always able to correct CFO within 0.8 kHz using a 128-length beacon (e.g., plots 1302, 1304), and within 1.3 kHz using a 64-length beacon (e.g., plots 1308, 1310). In the low RSSI regime, it can be observed that the 64-length beacon (e.g., plot 1312) begins to perform poorly, and is only able to correct 80% of the beacons to within 2 kHz error. In contrast, the 128-length beacon with low RSSI (e.g., plot 1306) performs similarly to the high RSSI 64-length (e.g., plot 1308), which indicates that extending the beacon length can further reduce CFO estimation error. It should be also noted that the amount of induced CFO does not affect accuracy.

Figure 14:
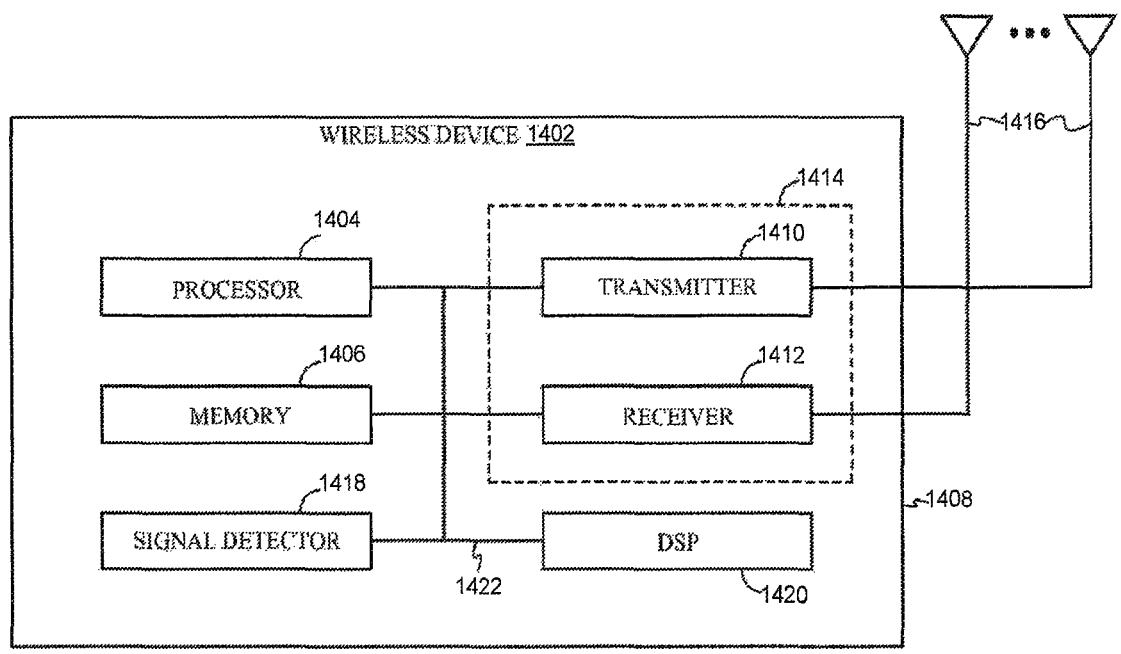
FIG. 14 is a block diagram of an example wireless device, in accordance with embodiments of the present disclosure.

FIG. 14 illustrates various components that may be utilized in a wireless device 1402 that may be employed within the system 100 illustrated in FIG. 1, the system 200 illustrated in FIG. 2, the system 500 illustrated in FIG. 5, the system illustrated in FIGS. 6A, 6B, 6C, and 6D, the system 700 illustrated in FIG. 7, and/or the system 800 illustrated in FIG. 8. The wireless device 1402 is an example of a device that may be configured to implement the various methods described herein. The wireless device 1402 may be a many-antenna base station (e.g., the base station 102 in FIG. 1, the base station 202 in FIG. 2, the base station 502 in FIG. 5, the base station 602 in FIGS. 6A, 6B, 6C, and 6D, the base station 702 in FIG. 7, and/or the base station 802 in FIG. 8), or a user (access) terminal (e.g., the user terminal 104 in FIG. 1, the user terminal 604A, 604B, 604C, etc. in FIGS. 6A, 6B, 6C, and 6D, and/or the user terminals 804A, 804B, 804C in FIG. 8).

The wireless device 1402 may include a processor 1404 which controls operation of the wireless device 1402. The processor 1404 may also be referred to as a central processing unit (CPU). Memory 1406, which may include both read-only memory (ROM) and random access memory (RAM), provides instructions and data to the processor 1404. A portion of the memory 1406 may also include non-volatile random access memory (NVRAM). The processor 1404 typically performs logical and arithmetic operations based on program instructions stored within the memory 1406. The instructions in the memory 1406 may be executable to implement the methods described herein.

The wireless device 1402 may also include a housing 1408 that may include a transmitter 1410 and a receiver 1412 to allow transmission and reception of data between the wireless device 1402 and another wireless node (e.g., another wireless node in a remote location). The transmitter 1410 and receiver 1412 may be combined into a transceiver 1414. One or more antennas 1416 may be attached to the housing 1408 and electrically coupled to the transceiver 1414. The wireless device 1402 may also include (not shown) multiple transmitters, multiple receivers, and multiple transceivers.

The wireless device 1402 may also include a signal detector 1418 that may detect and quantify the level of signals received by the transceiver 1414. The signal detector 1418 may quantify detection of such signals using total energy, energy per subcarrier per symbol, power spectral density and/or other quantification metrics. The wireless device 1402 may also include a digital signal processor (DSP) 1420 for use in processing signals.

The various components of the wireless device 1402 may be coupled by a bus system 1422, which may include a power bus, a control signal bus, and a status signal bus in addition to a data bus.

FIG. 15 is flow chart illustrating a method 1500 that may be performed at a many-antenna base station (e.g., the base station 502 illustrated in FIG. 5, and/or the base station 802 illustrated in FIG. 8), in accordance with embodiments of the present disclosure.

Operations of the method 1500 may begin by an encoder of the many antenna base station (e.g., the processor 1404 of the wireless device 1402 illustrated in FIG. 14)) encodes 1502 a beacon (e.g., the beacon 606 illustrated in FIG. 6A) into a base synchronization sequence (e.g., synchronization sequence s), the beacon comprising an identifier of the base station.

A circuit of the many-antenna base station (e.g., the processor 1404 of the wireless device 1402 illustrated in FIG. 14) generates 1504 a plurality of synchronization sequences based on the encoded base synchronization sequence (e.g., sequence s) and a set of beamforming weights (e.g., beamforming weights in sequences $b_1$, $b_2$, . . . , $b_n$), i.e., by covering (e.g., spreading) the encoded base synchronization sequence (e.g., sequence s) with the sequences $b_1$, $b_2$, . . . , $b_n$ with the beamforming weights.

A transmitter of the many antenna base station (e.g., the transmitter 1410 of the wireless device 1402 illustrated in FIG. 14) transmits 1506 the plurality of synchronization sequences, using a plurality of antennas, in a plurality of beam directions (e.g., beam directions 506 illustrated in FIG. 5) associated with the set of beamforming weights. In an embodiment, the spatial beam directions are orthogonal to each other. In another embodiment, the spatial beam directions are not orthogonal and a number of beam directions can be increased or decreased in order to alter a desired coverage area. The beamforming weights can be selected such that to limit the coverage area to only selected areas. In some embodiments, to achieve coding gain in the no-CSI mode, the plurality of synchronization sequences can be encoded based on at least one of Gold codes, Kasami codes, or Zadoff-Chu codes before the transmission.

Figure 16:
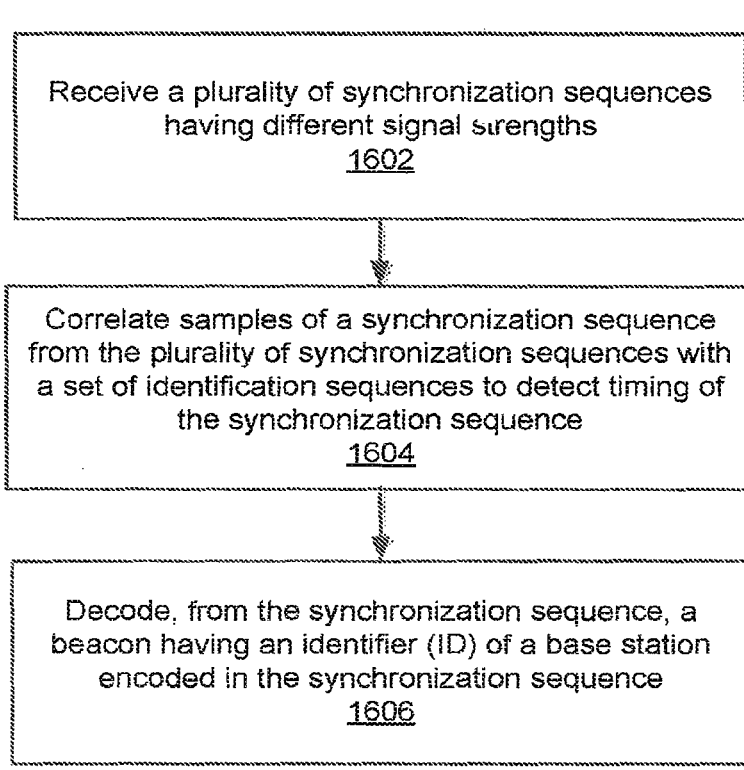
FIG. 16 is a flow chart illustrating a method that may be performed at a user equipment (UE) in communication with a many-antenna base station of a many-antenna MU-MIMO wireless communication system, in accordance with embodiments of the present disclosure.

FIG. 16 is a flow chart illustrating a method 1600 that may be performed at a user equipment (UE, such as UE 604A illustrated in FIG. 6A, UE 804A illustrated in FIG. 8) in communication with a many-antenna base station (e.g., the base station 502 illustrated in FIG. 5, the base station 802 illustrated in FIG. 8), in accordance with embodiments of the present disclosure.

Operations of the method 1600 may begin by a receiver of UE (e.g., the receiver 1412 of the wireless device 1402 illustrated in FIG. 14) receives 1602 a plurality of synchronization sequences (e.g., sequences R) having different signal strengths.

A first circuit of UE (e.g., the processor 1404 or DSP 1420 of the wireless device 1402 illustrated in FIG. 14) correlates 1604 samples of a synchronization sequence from the plurality of synchronization sequences with a set of identification sequences (e.g., a set of pre-known base station identification sequences or beacons) to detect timing of the synchronization sequence (i.e., to determine time synchronization). In some embodiments, the UE may first perform an autocorrelation on the received samples of the synchronization sequence to detect the existence of a repeating sequence within the synchronization sequence and reduce the computational overhead of streaming cross-correlation by exploiting the existence of the repeating sequence.

A second circuit of UE (e.g., the processor 1404 of the wireless device 1402 illustrated in FIG. 14) decodes 1606, from the synchronization sequence, a beacon (e.g., beacon 606 illustrated in FIG. 6A) having an identifier of the many-antenna base station encoded in the synchronization sequence.

Described embodiments include methods for designing an efficient control channel in many-antenna MU-MIMO wireless communication systems. The presented methods for control channel design provide fine-grained control over time, coding gains, and spatial resources, enabling optimizations both within a base station and across a wireless communication network. The presented control channel design allows base stations to leverage existing information, such as users' last known location, traffic patterns, and environmental properties to intelligently optimize timing, coding gains, and spatial coverage. Moreover, these same properties can be used to further extend the range of the cell in sparse networks, restrict coverage area, carefully tune interference, or dynamically incorporate more antennas to increase the capacity of a given base station.

Disclosed embodiments provide design, implementation, and experimental validation of a wireless control channel in many-antenna MU-MIMO systems. By holistically considering the practical design constraints of many-antenna base stations, a flexible design can be achieved that improves the range, or transmission efficiency, by over 40 dB on a 108 antenna base station with negligible overhead. The presented control channel design provides flexible optimization of space, time, code, and frequency resources, enabling it to scale from a few antennas up to 1000s of antennas. Not only does the presented control channel design drastically improve the performance of basic control channel operations by leveraging MU-MIMO as much as possible, but it also utilizes spatial information to make paging operations as quick and efficient as possible.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Disclosed embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Disclosed embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for wireless communications by a base station (BS), comprising:
exhibiting 2 modes of operation, a no-CSI mode and a CSI (MIMO) mode, where said no-CSI mode occurs before the BS has CSI knowledge of supported active users and the CSI (MIMO) mode occurs after time-frequency synchronization and collection of channel state information;
generating a plurality of synchronization sequences that encode a beacon that is geographically locally unique to identify the BS;
generating a set of beamforming weights allowing for spatial directional transmission of beam patterns;
transmitting, using one to a plurality of antennas, said beacon in a plurality of beam directions associated with said set of beamforming weights;
utilizing open-loop beamforming and beamsweeping in said no-CSI mode to sweep said synchronization sequences across a coverage area, transmitting a single synchronization sequence sent on a single beam direction, or beam pattern, intermittently at the beginning of each transmission frame in a different beam direction of the plurality of beam directions;
receiving, by user equipment (UE), said geographically locally unique ID of the BS via beacons;
simultaneously identifying and synchronizing with said BS through beacon decoding;
transmitting an uplink pilot from the UE to the BS;
estimating channel state information (CSI) associated with the UE based on the received uplink pilot to the BS;
collecting UE specific CSI information from said uplink pilot and using collected CSI information to establish a CSI mode (MIMO communication) link with the UE based on the received pilot to establish said CSI mode (MIMO communication) link.

2. The method of claim 1, wherein transmitting synchronization sequences comprises:
transmitting each synchronization sequence followed by transmitting at least one repetition of that synchronization sequence.

3. The method of claim 1, wherein the plurality of synchronization sequences may further encode unique user IDs for performing simultaneous synchronization and a paging sequence,
wherein said unique user IDs are assigned to each user upon association to with the base station.

4. The method of claim 1 further comprising:
allocating at least one uplink slot to a user equipment (UE) for random access;
receiving an uplink pilot from said UE in the at least one said allocated uplink slot;
estimating channel state information (CSI) associated with the UE based on the received uplink pilot;
establishing a CSI mode (MIMO communication) link with the UE based on the UE's CSI; and
conveying control channel information to said UE via said CSI mode (MIMO communications link.

5. The method of claim 4, wherein the control channel information conveyed over the CSI mode MIMO communication link comprises at least one of:
a Basic Service Set Identifier (BSSID), a Service Set Identifier (SSID), a modulation rate, synchronization maintenance, scheduling information, gain control information, channel estimation information, authorization or encryption information associated with the BS.

6. The method of claim 1, further comprising:
assigning a unique paging sequence to each user equipment (UE) synchronized and associated with the BS in the CSI mode (MIMO mode); and transmitting, using the plurality of antennas, the paging sequence in a set of beam directions until being received by that UE.

7. The method of claim 6, further comprising:
receiving, from the UE, location information associated with the UE, the location information comprises at least one of a physical location of the UE, channel state information (CSI) associated with the UE, information about strengths of one or more of the synchronization sequences received at the UE, or an angle of arrival of at least one of the synchronization sequences received at the UE, and the method further comprises selectively guiding the direction of the paging sequence in the set of beam directions based on the location information.

8. The method of claim 6, further comprising:
receiving an uplink pilot transmitted from the UE upon detection of the paging sequence;
estimating channel state information (CSI) associated with the UE based on said received uplink pilot;
establishing a CSI mode (MIMO communication) link with the UE based on said estimated CSI.

9. The method of claim 1, further comprising:
transmitting one or more paging sequences unique to one or more user equipments (UEs) served by the BS in different beam directions of the plurality of beam directions which may occur simultaneously on different beams; and
optionally transmitting said paging sequences simultaneously with said beacon.

10. An apparatus for wireless communications capable of operating in no-CSI and CSI modes, comprising:
a base station (BS) containing a plurality of antenna for transmission and reception of control channel functions;
an encoder configured to encode a beacon into a synchronization sequence, the beacon comprising a geographically locally unique identifier (ID) of the apparatus;
a circuit configured to generate a plurality of synchronization and a set of beamforming weights allowing for spatial directional transmission of single beam directions or beam patterns;
a BS transmitter configured to transmit, using a plurality of antennas, said plurality of synchronization sequences, including paging sequences and beacons, in a plurality of beam directions associated with said set of beamforming weights wherein a single synchronization sequence is sent on a single beam direction, or beam pattern, intermittently at the beginning of each transmission frame and/or may be transmitted simultaneously with a paging sequence to different users;
a user equipment (UE) for reception of a beacon encoded into a synchronization sequence, decoding of said beacon and transmission of an uplink pilot to a BS;
said BS antennas utilized for no-CSI, open-loop beamforming time-frequency synchronization, association, paging, random access, CSI collection, and CSI MIMO mode uplink and downlink data transfer.

11. A method for wireless communications, comprising:
sending in no-CSI mode, from a base station (BS) to a user equipment (UE), an encoded beacon comprising a geographically unique identifier (ID);
generating a plurality of synchronization sequences and a set of beamforming weights, altering amplitude and signal phase, allowing for spatial directional transmission of beam patterns;
beamsweeping, via open-loop beamforming and in said no-CSI mode, synchronization sequences in a plurality of beam directions associated with said set of beamforming weights wherein a single synchronization sequence is sent on a single beam direction, or beam pattern, intermittently, at the beginning of each transmission frame in a different beam direction of the plurality of beam direction across a coverage area;

receiving, by a UE, a plurality of synchronization sequences having different signal strengths;

correlating samples of a synchronization sequence from the plurality of synchronization sequences with a set of identification sequences to detect timing and frequency offset of the synchronization sequence; and decoding, from the synchronization sequence, a beacon having a geographically locally unique identifier (ID) of a base station (BS) encoded in the synchronization sequence;

decoding, from the synchronization sequence, a paging request uniquely identifying the user; and soft-associating to multiple base stations (BS) to determine the most compatible base station (BS) channel quality.

12. The method of claim 11, further comprising:
performing autocorrelation on the samples of the synchronization sequence before the correlation.

13. The method of claim 11, further comprising:
monitoring for at least one synchronization sequence of the plurality of synchronization sequences; and
varying gain settings until detecting a defined number of sequences within the plurality of synchronization sequences.

14. The method of claim 11, further comprising:
upon decoding the beacon with the identifier (ID) of the BS, soft associating with said BS, and transmitting a pilot to the BS in one of slots reserved for random access;
receiving control channel information transmitted from the BS upon reception, by the BS, of the pilot to establish a CSI (MIMO communication) link for conveyance of remaining control channel information to the user.

15. The method of claim 14, further comprising:
associating UE, through full association with said BS based on the received control channel information.

16. The method of claim 14, further comprising:
electing to fully associate with another BS upon reception of other BS control channel information.

17. The method of claim 11, further comprising:
transmitting location information to said BS, or other selected BS, upon decoding said BS or other selected BS's beacon;
receiving a unique paging sequence transmitted from said BS or other selected BS based on the location information;
transmitting, based on the received paging sequence, an uplink pilot in a dedicated random access pilot slot.

18. The method of claim 11, further comprising:
receiving said samples of the synchronization sequence on multiple beamforming streams of a user equipment (UE); and
correlating said samples of the synchronization sequence on each beamforming stream of the UE to decode said beacon.

19. The method of claim 11, further comprising:
detecting the synchronization sequence on an antenna of a user equipment (UE);
computing beamforming weights based on the detected synchronization sequence; and correlating a subset of the samples of the synchronization sequence on multiple beamforming streams of the UE using the beamforming weights to decode the beacon.

20. A many antenna MU-MIMO system for wireless communications capable of operating in no-CSI and CSI modes, comprising:
a base station (BS) containing a plurality of antenna for transmission and reception of control channel functions;
an encoder configured to encode a beacon into a synchronization sequence, the beacon comprising a geographically locally unique identifier (ID) of the apparatus;
a UE receiver configured to receive a plurality of synchronization sequences having different signal strengths;
a BS transmitter configured to transmit, in no-CSI mode via open-loop beamsweeping, using a plurality of antennas, said plurality of synchronization sequences or paging sequences in a plurality of beam directions associated with said set of beamforming weights wherein a single beacon is sent on a single beam direction, or beam pattern, intermittently at the beginning of each transmission frame and/or may be transmitted simultaneously with a paging sequence to different users;
a first circuit configured to correlate samples of a received synchronization sequence from the plurality of synchronization sequences with a set of identification sequences to detect timing and frequency offset of the synchronization sequence; and
a second circuit configured to decode, from the synchronization sequence, a beacon having a geographically locally unique identifier (ID) encoded in the synchronization sequence, or a paging request encoded in the synchronization sequence;
said UE receiver capable of soft-associating with a single or plurality of BSs to determine the most compatible base station (BS) channel quality;
said UE receiver capable of fulling associating with one of a plurality of base stations based on said determination;
said UE capable of transmitting location information associated with the UE, the location information comprises at least one of a physical location of the UE, channel state information (CSI) associated with the UE, information about strengths of one or more of the synchronization sequences received at the UE, or an angle of arrival of at least one of the synchronization sequences received at the UE;
said BS capable of transmitting the paging sequence in the set of beam directions based on said location information; and
said BS and UE, after soft-association, are capable of communicating via MIMO uplink and downlink in CSI (MIMO) mode.

21. The system of claim 20, wherein, once a valid MIMO communication link is established, said communication link may be used to convey all remaining control channel information including, but not limited to, at least one of the following: BSSID, SSID, modulation rates, pilot and data scheduling, gain control, channel estimation information related to the MU-MIMO communication link, encryption information associated with the many-antenna base station and maintenance and improvement of synchronization for active users.

22. The System of claim 20, wherein active users may periodically send random access requests to the BS to maintain synchronization and association, check for missed paging requests, and to update a user's location to assist with a maintained, updated, or optimized control channel operation for the transmittal of future paging sequences.

23. The system of claim 20, wherein a gain gap exists between said no-CSI open-loop beam sweeping mode and CSI MU-MIMO mode of communications which is correctable, in the no-CSI mode, by employing a variable coding gain in both the uplink and downlink communication by extending a signal over a longer period of time thus tuning the gains to match between no-CSI and CSI modes, dynamically, balancing gain versus overhead.

* * * * *

UNITED STATES PATENT AND TRADEMARK OFFICE
CERTIFICATE OF CORRECTION

PATENT NO.        : 10,455,608 B2
APPLICATION NO.   : 15/539997
DATED             : October 22, 2019
INVENTOR(S)       : Clayton Wells Shepard et al.

It is certified that error appears in the above-identified patent and that said Letters Patent is hereby corrected as shown below:

In the Drawings

Figure 11, Drawing sheet 11 of 17 - change the name of the diagram from "Uplink Singal Strength (dBm)" to "Uplink Signal Strength (dBm)"

In the Specification

Column 1, Line 26 - change "Many-antenna MU-MIIMO..." to "Many-antenna MU-MIMO..."

Column 2, Line 10 - change "LIE can also..." to "UE can also..."

Column 10, Line 16 - change "The gain of A antenna..." to "The gain of M antenna..."

In the Claims

Column 29, Line 27 - change "BS;" to "BS; and"

Column 29, Line 43 - change "upon association to with the base station." to "upon association with the base station."

Column 29, Line 54 - change "CSI mode (MIMO communications link." to "CSI mode (MIMO communication) link."

Column 30, Line 19 - change "pilot;" to "pilot; and"

Column 30, Line 39 - change "and a set of beamforming weights allowing for..." to "sequences based on the encoded base synchronization sequence and a set of beamforming weights allowing for..."

Column 30, Line 50 - change "to different users;" to "to different users; and"

Signed and Sealed this
Eleventh Day of August, 2020

Andrei Iancu
*Director of the United States Patent and Trademark Office*

CERTIFICATE OF CORRECTION (continued)
U.S. Pat. No. 10,455,608 B2

Column 30, Line 53 - change "pilot to a BS," to "pilot to a BS; and"

Column 31, Line 35 - change "access;" to "access; and"

Column 31, Line 53 - change "information;" to "information; and"